(12) United States Patent
Ando et al.

(10) Patent No.: US 8,283,072 B2
(45) Date of Patent: Oct. 9, 2012

(54) ELECTRIC STORAGE DEVICE

(75) Inventors: Nobuo Ando, Tokyo (JP); Kenji Kojima, Tokyo (JP); Yukinori Hatou, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 1065 days.

(21) Appl. No.: 12/206,843

(22) Filed: Sep. 9, 2008

(65) Prior Publication Data
US 2009/0075161 A1    Mar. 19, 2009

(30) Foreign Application Priority Data
Sep. 18, 2007    (JP) .................... 2007-240986

(51) Int. Cl.
*H01M 10/40* (2006.01)
*H01M 4/72* (2006.01)

(52) U.S. Cl. .......... 429/241; 429/94; 429/209; 429/213; 429/231.8; 429/231.95

(58) Field of Classification Search .................... 429/241
See application file for complete search history.

(56) References Cited

U.S. PATENT DOCUMENTS
2005/0153173 A1    7/2005    Kumashiro et al.

FOREIGN PATENT DOCUMENTS

| JP | 11-135105 | * | 5/1999 |
| JP | 2000-36325 A | | 2/2000 |
| JP | 2001-351688 A | | 12/2001 |
| JP | 2005-203131 A | | 7/2005 |
| WO | WO-02/41420 A1 | | 5/2002 |

* cited by examiner

*Primary Examiner* — John S Maples
(74) *Attorney, Agent, or Firm* — McDermott Will & Emery LLP

(57) ABSTRACT

An electric storage device has positive and negative electrode systems. The positive electrode system includes a positive electrode having a current collector and a positive-electrode mixture layer. The negative electrode system includes a negative electrode having a current collector and a negative-electrode mixture layer. The negative electrode system further includes a first negative-electrode mixture layer and a second negative-electrode mixture layer, which are connected to each other and which include at least one different material or have different material composition ratios. The first negative-electrode mixture layer and the second negative-electrode mixture layer have different charge/discharge characteristics. A through-hole is formed in the current collector arranged between the first negative-electrode mixture layer and the second negative-electrode mixture layer.

9 Claims, 10 Drawing Sheets

ELECTRIC STORAGE DEVICE

CROSS-REFERENCE TO RELATED APPLICATIONS

The disclosure of Japanese Patent Application No. 2007-240986 filed on Sep. 18, 2007 including the specification, drawing and abstract is incorporated herein by reference in its entirety.

BACKGROUND OF THE INVENTION

1. Field of the Invention

The present invention relates to a technology that is well adaptable to an electric storage device including plural negative electrodes.

2. Description of the Related Arts

High energy density and high output density are required for an electric storage device that is mounted to an electric vehicle, a hybrid vehicle, or the like. Therefore, a lithium ion secondary battery, an electric double layer capacitor, etc. have been nominated as a candidate for the electric storage device. However, the lithium ion secondary battery has a high energy density, but low output density. The electric double layer capacitor has a high output density, but low energy density.

In view of this, there has been proposed an electric storage device called a hybrid capacitor in which the electric storage principles of the lithium ion secondary battery and those of the electric double layer capacitor are combined. The hybrid capacitor employs an activated carbon, which is used for an electric double layer capacitor, for a positive electrode so as to accumulate charges by utilizing the electric double layer in the positive electrode, and employs a carbon material, which is used for a lithium ion secondary battery, for a negative electrode, and lithium ions are doped into the carbon material of the negative electrode so as to accumulate charges. The application of the electric storage mechanism described above makes it possible to enhance the output density and the energy density. However, a further improvement in the output density and the energy density has been demanded in order to use the electric storage mechanism described above for a vehicle power source.

Methods for enhancing both an output density and an energy density of a battery include the one in which an internal resistance is decreased by coating an electrode mixture material to be thin, and the one in which a battery having a high energy density and a capacitor having a high output density are connected in parallel. However, in the former method, the electrode mixture material is coated to be thin, which entails a reduction in the energy density of the electric storage device, or which makes the assembly difficult to thereby increase cost of the electric storage device. In the latter method, the battery and the capacitor are combined, which entails increased cost of the electric storage device due to a complicated control circuit.

In order to solve these problems, there has been proposed an electric storage device in which positive-electrode current collectors of a lithium ion secondary battery and those of an electric double layer capacitor are connected to each other, and negative-electrode current collectors of the lithium ion secondary battery and those of the electric double layer capacitor are connected to each other (e.g., see JP-A-2001-351688). Further, an electric storage device has been proposed in which a mixture material including an active carbon or the like and a mixture material including a lithium cobalt oxide or the like are double-layer coated on a single current collector (e.g., see JP-A-2000-36325 and JP-A-2005-203131), or an electric storage device has been proposed in which a mixture material having mixed therein an active carbon and a lithium cobalt oxide is coated on a single current collector (e.g., see International Publication WO2002/41420).

However, in the electric storage device disclosed in JP-A-2001-351688, it is difficult to cancel the deviation in the potential between the electrodes that are connected to each other. Therefore, over discharge or overcharge of the lithium ion secondary battery or the electric double layer capacitor can occur. The occurrence of the over discharge or overcharge described above causes the deterioration in the durability of the electric storage device. In the electric storage devices disclosed in JP-A-2000-36325, JP-A-2005-203131, and International Publication WO2002/41420, it is difficult to ensure the output density by sufficiently reducing the internal resistance, since the device has a structure in which the active carbon and the lithium cobalt oxide are mixed or a structure in which the active carbon and the lithium cobalt oxide are laminated. Further, the electric storage devices have a structure in which the lithium cobalt oxide is in contact with the active carbon. Therefore, the effect caused by the deteriorated lithium cobalt oxide also affects the active carbon, which deteriorates the durability of the electric storage device.

SUMMARY OF THE INVENTION

An object of the present invention is to enhance the energy density and the output density of an electric storage device without deteriorating the durability of an electric storage device.

An electric storage device according to the present invention has a positive electrode system including a positive electrode having a current collector and a positive-electrode mixture layer, and a negative electrode system including a negative electrode having a current collector and a negative-electrode mixture layer. The negative electrode system includes a first negative-electrode mixture layer and a second negative-electrode mixture layer. The mixture layers are connected to each other, and which include at least one different material or have a different material-composition ratios, i.e., the negative mixture layers are of different types in charge/discharge characteristic. A through-hole is formed on the current collector arranged between the first negative-electrode mixture layer and the second negative-electrode mixture layer.

In the electric storage device according to the present invention, the first negative-electrode mixture layer and the second negative-electrode mixture layer are electrically connected to each other for moving ions between the first negative-electrode mixture layer and the second negative-electrode mixture layer via the through-hole.

In the electric storage device according to the present invention, each the first negative-electrode mixture layer and the second negative-electrode mixture layer includes an active material differ from each other.

In the electric storage device according to the present invention, the first negative-electrode mixture layer contains one selected from the group consisting of a polyacene-based organic semiconductor which is a heat-treated material of an aromatic condensation polymer and has a polyacene skeletal structure in which a ratio of a number of hydrogen atoms to a number of carbon atoms is 0.05 or more and 0.50 or less, a graphite, and a hard carbon (non-graphitizable carbon), as a one negative-electrode active material and the second negative-mixture layer contains one selected from the group consisting of two of the above three materials other than the negative-electrode active material contained in the first negative-electrode mixture layer, as a negative-electrode active material.

In the electric storage device according to the present invention, the negative electrode system includes a first negative electrode and a second negative electrode that sandwich the positive electrode, wherein the through-hole is formed on the current collector of the positive electrode arranged between the first negative-electrode mixture layer of the first negative electrode and the second negative-electrode mixture layer of the second negative electrode.

In the electric storage device according to the present invention, the positive electrode system includes a first positive electrode and a second positive electrode that sandwich the negative electrode, wherein the though-hole is formed on the current collector of the negative electrode having the first negative-electrode mixture layer on its one surface and the second negative-electrode mixture layer on its other surface.

The electric storage device according to the present invention has a lithium ion source that is short-circuited to at least either one of the negative electrode and the positive electrode. Lithium ions are doped from the lithium ion source into at least either one of the negative electrode and the positive electrode.

The electric storage device according to the present invention has a device structure of a laminate type in which the positive electrode and the negative electrode are alternately laminated, or a device structure of a wound type in which the positive electrode and the negative electrode are laminated and wound.

In the electric storage device according to the present invention, the positive-electrode mixture layer contains an active carbon.

According to the present invention, since the first negative-electrode mixture layer and the second negative-electrode mixture layer, which are of different types, are combined and used, the energy density and the output density of the electric storage device can be enhanced. Further, since the through-hole is formed on the current collector arranged between the first negative-electrode mixture layer and the second negative-electrode mixture layer, ions can move between the first negative-electrode mixture layer and the second negative-electrode mixture layer. Consequently, even if the first negative-electrode mixture layer and the second negative-electrode mixture layer, which are of different types, are combined, the variation in the potential between the first negative-electrode mixture layer and the second negative-electrode mixture layer can be canceled, whereby the durability of the electric storage device can be ensured.

DETAILED DESCRIPTION OF THE PREFERRED EMBODIMENTS

Figure 1:
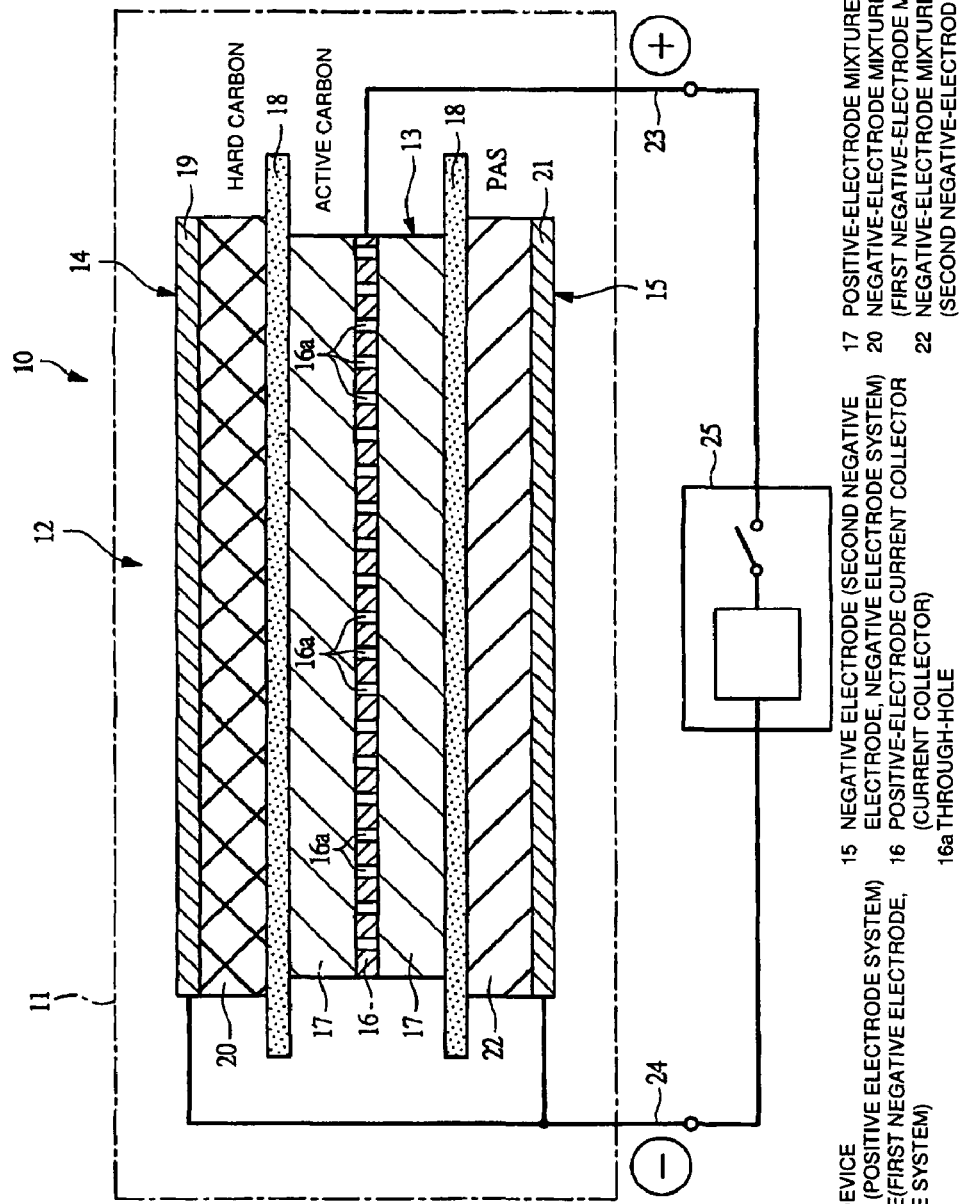
FIG. 1 is a sectional view schematically showing an internal structure of an electric storage device according to one embodiment of the present invention.

FIG. 1 is a sectional view schematically showing an internal structure of an electric storage device 10 according to one embodiment of the present invention. As shown in FIG. 1, an electrode laminate unit 12 is arranged at the inside of a laminate film 11 constituting an outer casing of the electric storage device 10. The electrode laminate unit 12 includes a positive electrode system having a single positive electrode 13, and a negative electrode system having two negative electrodes 14 and 15. An electrolyte made of aprotic organic solvent containing a lithium salt is injected into the laminate film 11 that is sealed by a thermal welding.

The positive electrode 13 arranged at the center of the electrode laminate unit 12 has a positive-electrode current collector (current collector) 16 provided with a large number of through-holes 16a, and positive-electrode mixture layers 17 mounted on both surfaces of the positive-electrode current collector 16. A first negative electrode 14 and a second negative electrode 15 are arranged with separators 18 therebetween so as to sandwich the positive electrode 13. The negative electrode 14 includes a negative-electrode current collector (current collector) 19 and a first negative-electrode mixture layer 20, while the other negative electrode 15 includes a negative-electrode current collector (current collector) 21 and a second negative-electrode mixture layer 22. A positive electrode terminal 23 is connected to the positive-electrode current collector 16, while a negative electrode terminal 24 is connected to the pair of the negative-electrode current collectors 19 and 21 that are connected to each other. Specifically, in the illustrated electric storage device 10, an electric storage component including the positive-electrode mixture layer 17 and the negative-electrode mixture layer 20 opposite to the positive-electrode mixture layer 17 and an electric storage component including the positive-electrode mixture layer 17 and the negative-electrode mixture layer 22 opposite to the positive-electrode mixture layer 17 are connected in parallel. A charge/discharge tester 25 that controls the electric storage device 10 during the charging state and in the discharging state is connected to the positive-electrode terminal 23 and the negative-electrode terminal 24.

The positive-electrode mixture layer 17 of the positive electrode 13 contains an active carbon as a positive-electrode active material that allows lithium ions to be reversibly doped thereinto and de-doped therefrom (hereinafter referred to as dope and de-dope), while the negative-electrode mixture layer 20 of the negative electrode 14 contains a hard carbon, as a negative-electrode active material that allows lithium ions to be reversibly doped thereinto and de-doped therefrom. The negative-electrode mixture layer 22 of the negative electrode 15 contains a polyacene-based organic semiconductor (PAS) as a negative-electrode active material that allows lithium ions to be reversibly doped there into and de-doped therefrom. A hard carbon, which is contained in the negative-electrode mixture layer 20, has a high capacity characteristic that means a hard carbon has a high electrostatic capacity at a low potential, and a PAS, which is contained in the negative-electrode mixture layer 22, has a high output characteristics that means a PAS has a low resistance and a high capacity for storing lithium ions. Lithium ions are doped beforehand into the illustrated negative electrodes 14 and 15 from a lithium ion source such as a metal lithium or the like, by which the potential of the negative electrode is reduced to enhance an energy density of the electric storage device 10. The negative electrodes 14 and 15 have an electrode area greater than that of the positive electrode 13, by which the deposition of the metal lithium on the negative electrodes 14 and 15 is prevented.

In the specification of the present invention, the term "doping (dope)" involves "occlude", "carry", "adsorb" or "insert", and specifically a phenomenon where lithium ions and/or anions enter a positive-electrode active material or a negative-electrode active material. The term "de-doping (de-dope)" involves "release" and "desorb", and specifically a phenomenon where lithium ions or anions desorb from a positive-electrode active material or a negative-electrode active material.

Figure 2:
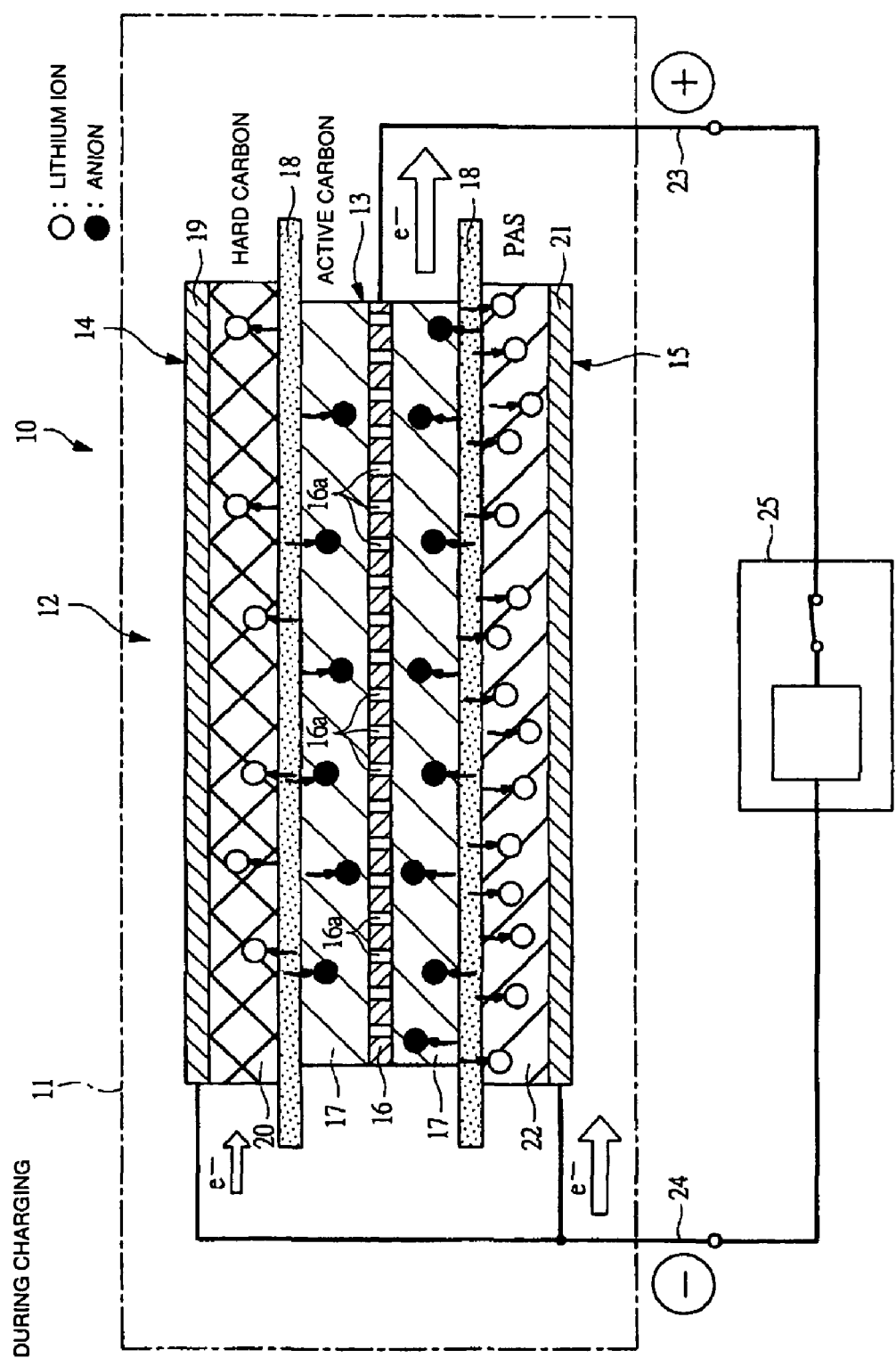
FIG. 2 is an explanatory view showing a charge/discharge operation of the electric storage device.
Figure 3:
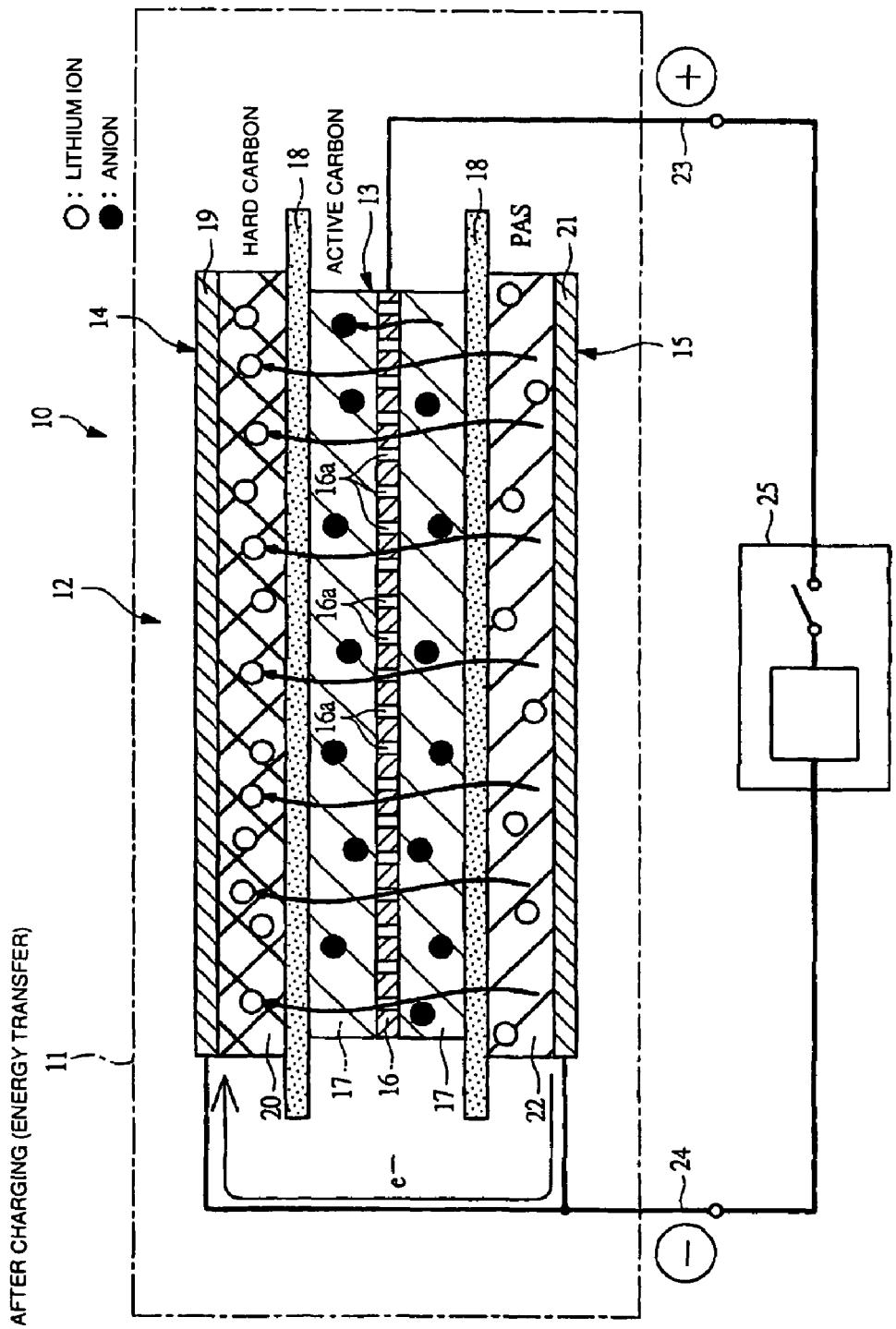
FIG. 3 is an explanatory view showing a charge/discharge operation of the electric storage device.

Subsequently explained is a charge/discharge operation of the electric storage device 10 having the structure. FIGS. 2 to 5 are explanatory views showing the charge/discharge operation of the electric storage device 10. As shown in FIG. 2, when the electric storage device 10 is charged by actuating the charge/discharge tester 25, anions are doped into the positive-electrode mixture layer 17 of the positive electrode 13, and lithium ions are doped into the negative-electrode mixture layers 20 and 22 of the negative electrodes 14 and 15. Since a PAS has a lower resistance than that of a hard carbon, electrons more easily move into the negative-electrode mixture layer 22 than into the negative-electrode mixture layer 20, whereby a current flows more from the negative-electrode mixture layer 22 than from the negative-electrode mixture layer 20 during the charging. Then, as shown in FIG. 3, the negative-electrode mixture layer 20 and the negative-electrode mixture layer 22 are electrically connected, and a large number of through-holes 16a are formed on the negative-electrode current collector 16 arranged between the negative-electrode mixture layer 20 and the negative-electrode mixture layer 22. Therefore, the lithium ions (ions) of the negative-electrode mixture layer 22 move to the negative-electrode mixture layer 20 after the charging.

Specifically, many lithium ions are doped into the negative-electrode mixture layer 22 during the charging, whereby the potential of the negative-electrode mixture layer 22 is temporarily less than the potential of the negative-electrode mixture layer 20. However, since the negative-electrode mixture layers 20 and 22 are connected to each other, and the through-holes 16a are formed on the positive-electrode current collector 16, the lithium ions of the negative-electrode mixture layer 22 gradually move to the negative-electrode mixture layer 20 until the potentials of the negative-electrode mixture layer 20 and the negative-electrode mixture layer 22 reach an equilibrium potential. Therefore, many lithium ions can be temporarily doped into the negative-electrode mixture layer 22 containing PAS having a low resistance during the charging, and then, the lithium ions of the negative-electrode mixture layer 22 can move to the negative-electrode mixture layer 20. Accordingly, the electric storage device can be charged with a high current without applying an excessive load on the negative-electrode mixture layer 20 containing hard carbon having a higher resistance than PAS. In particular, even in a case where a high-current charging is performed in a low temperature, in which the internal resistance increases, an excessive load is not applied to the negative-electrode mixture layer 20. Therefore, the deposition of the metal lithium on the negative-electrode mixture layer 20 is prevented, whereby the durability of the electric storage device 10 can be enhanced.

Figure 4:
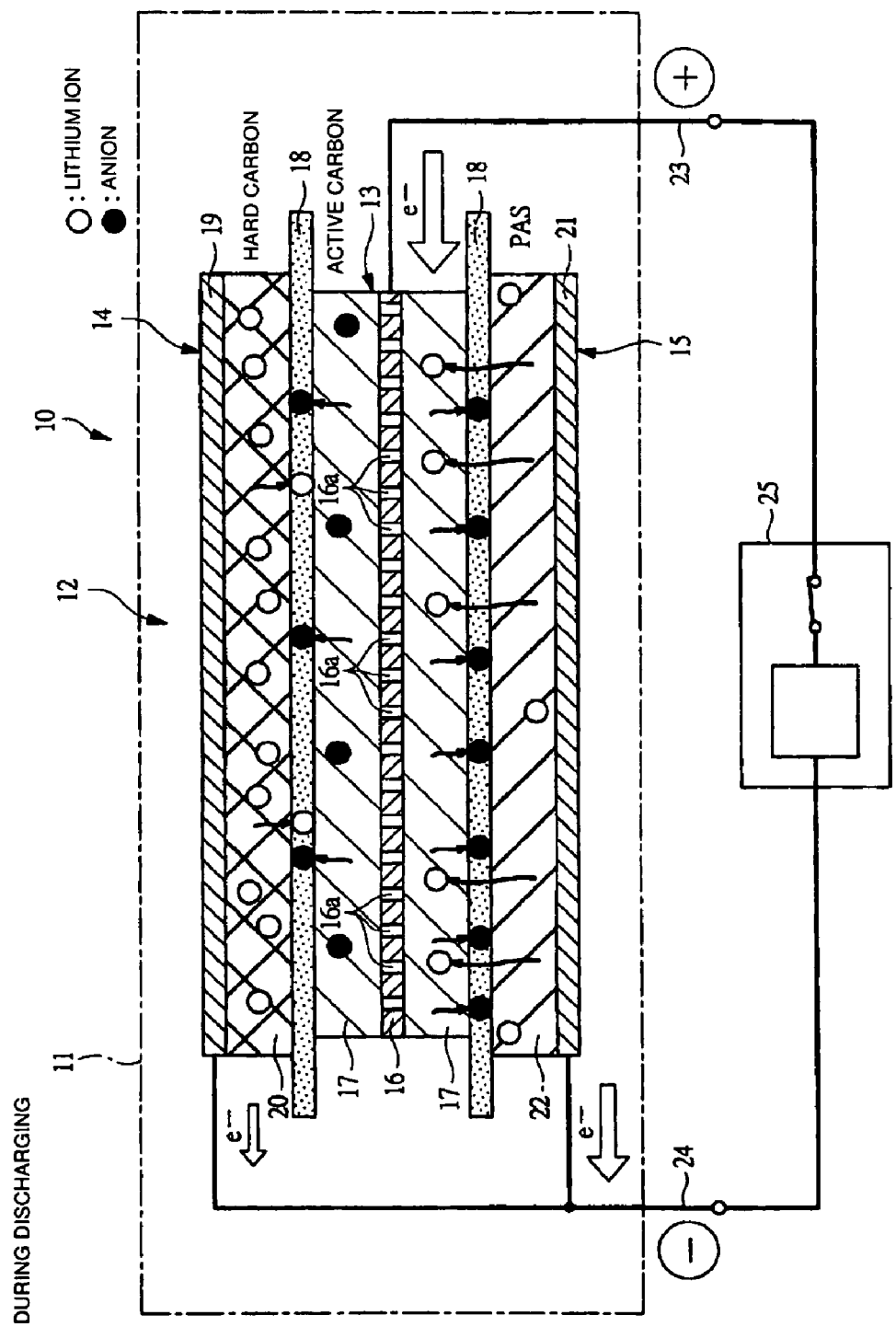
FIG. 4 is an explanatory view showing a charge/discharge operation of the electric storage device.
Figure 5:
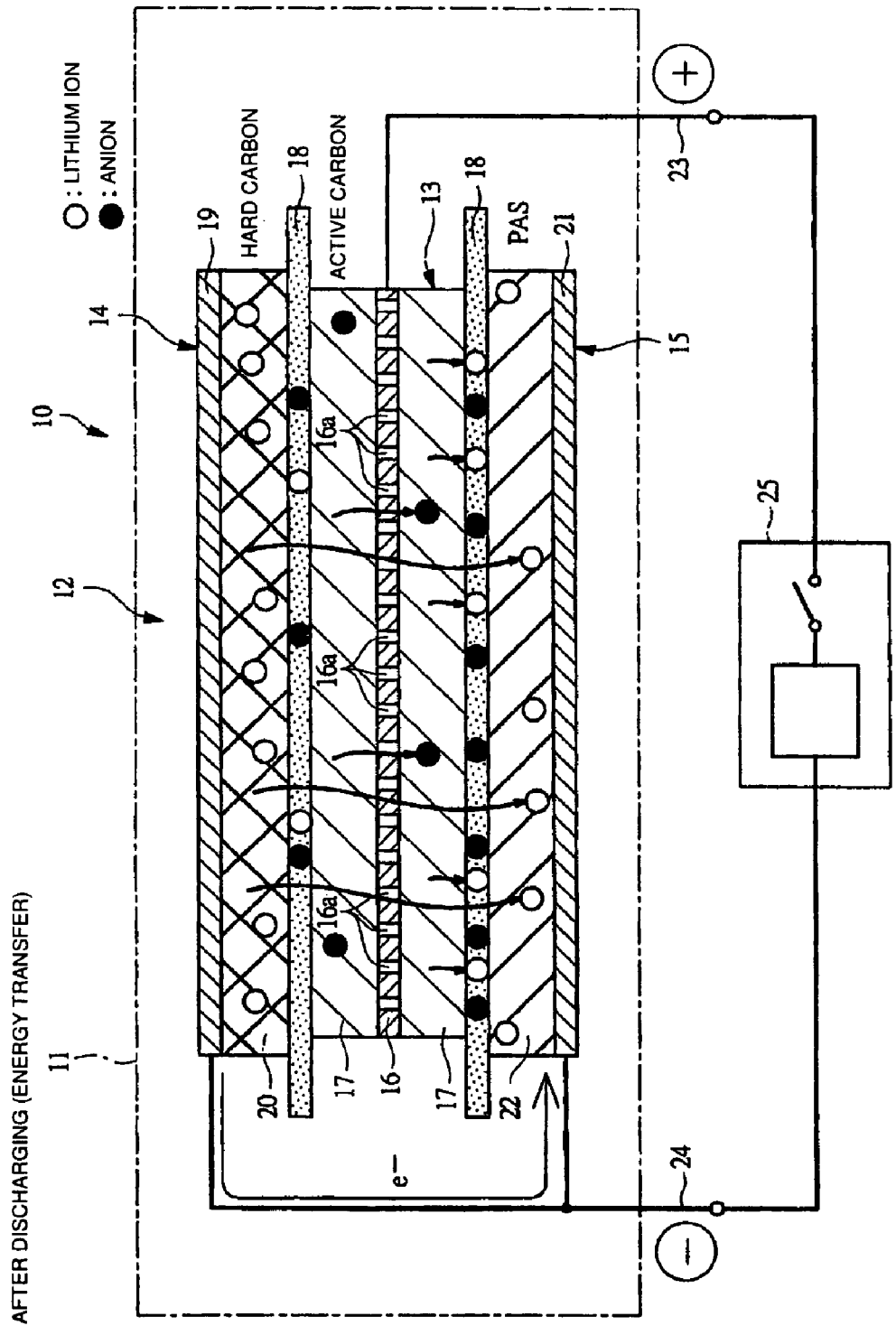
FIG. 5 is an explanatory view showing a charge/discharge operation of the electric storage device.

Next, as shown in FIG. 4, when the electric storage device 10 is discharged by actuating the charge/discharge tester 25, anions are de-doped from the positive-electrode mixture layer 17 of the positive electrode 13, and lithium ions are de-doped from the negative-electrode mixture layers 20 and 22 of the negative electrodes 14 and 15. Since a PAS has a lower resistance than that of a hard carbon, electrons more easily move from the negative-electrode mixture layer 22 than from the negative-electrode mixture layer 20, whereby a high current flows more to the negative-electrode mixture layer 22 than to the negative-electrode mixture layer 20 in the discharging. As described above, the negative-electrode mixture layer 20 and the negative-electrode mixture layer 22 are electrically connected, and the through-holes 16a are formed on the negative-electrode current collector 16. Therefore, the lithium ions of the negative-electrode mixture layer 20 move to the negative-electrode mixture layer 22 after the discharging as shown in FIG. 5.

Specifically, many lithium ions are de-doped from the negative-electrode mixture layer 22 in the discharging, whereby the potential of the negative-electrode mixture layer 22 temporarily exceeds the potential of the negative-electrode mixture layer 20. However, since the negative-electrode mixture layers 20 and 22 are connected to each other, and the through-holes 16a are formed on the positive-electrode current collector 16, the lithium ions of the negative-electrode mixture layer 20 gradually move to the negative-electrode mixture layer 22 until the potentials of the negative-electrode mixture layer 20 and the negative-electrode mixture layer 22 reach an equilibrium potential. Therefore, many lithium ions can be temporarily de-doped from the negative-electrode mixture layer 22 containing a PAS having a low resistance in the discharging, and then, the lithium ions can move from the negative-electrode mixture layer 20 to the negative-electrode mixture layer 22. Accordingly, the output density and the energy density of the electric storage device 10 can be enhanced. FIGS. 2 to 5 are imaginary views, wherein the number and balance of the anions and the lithium ions are not considered.

Figure 6:
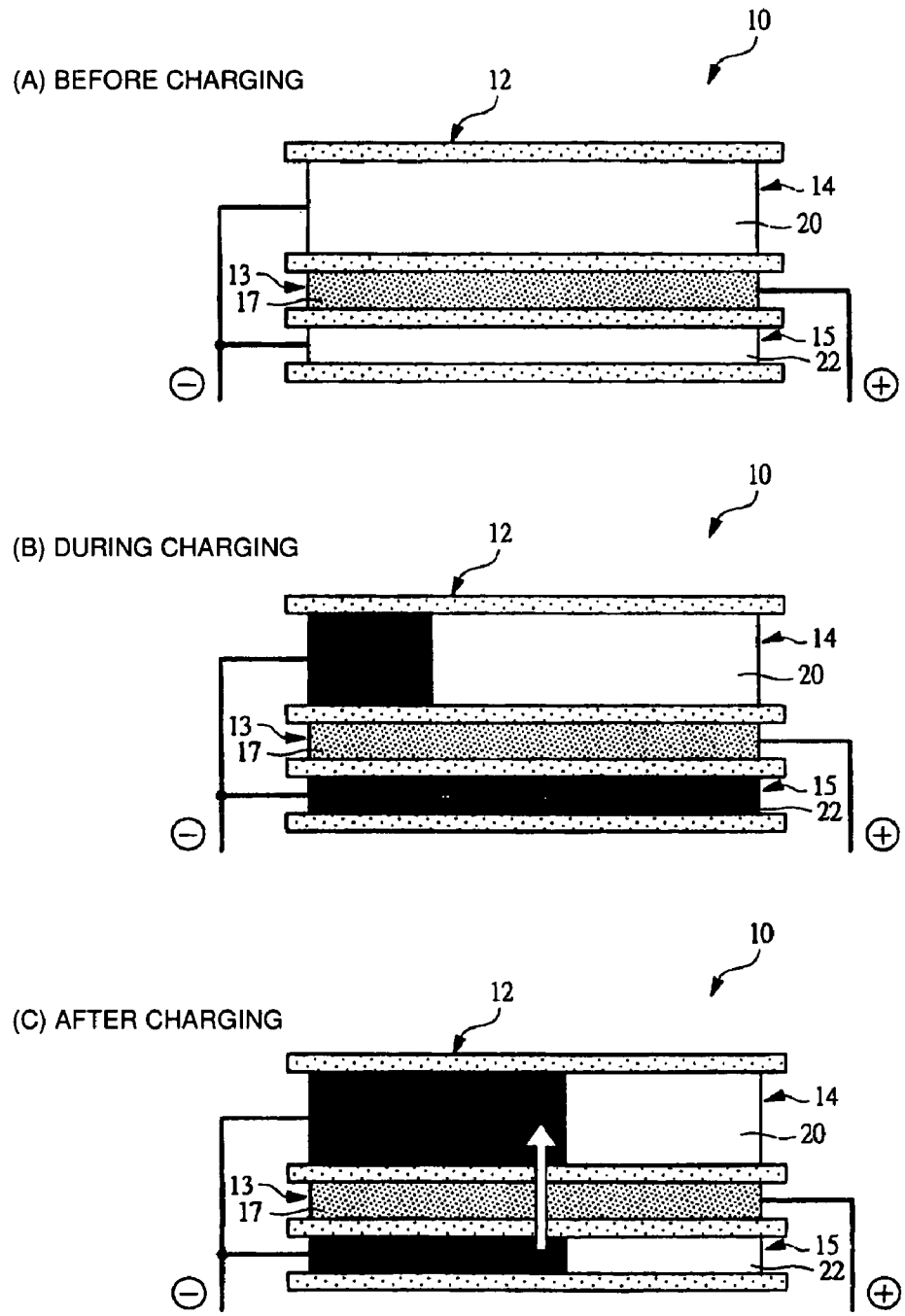
FIGS. 6A to 6C are imaginary views showing a transfer state of energy between the negative electrodes in the charge operation.
Figure 7:
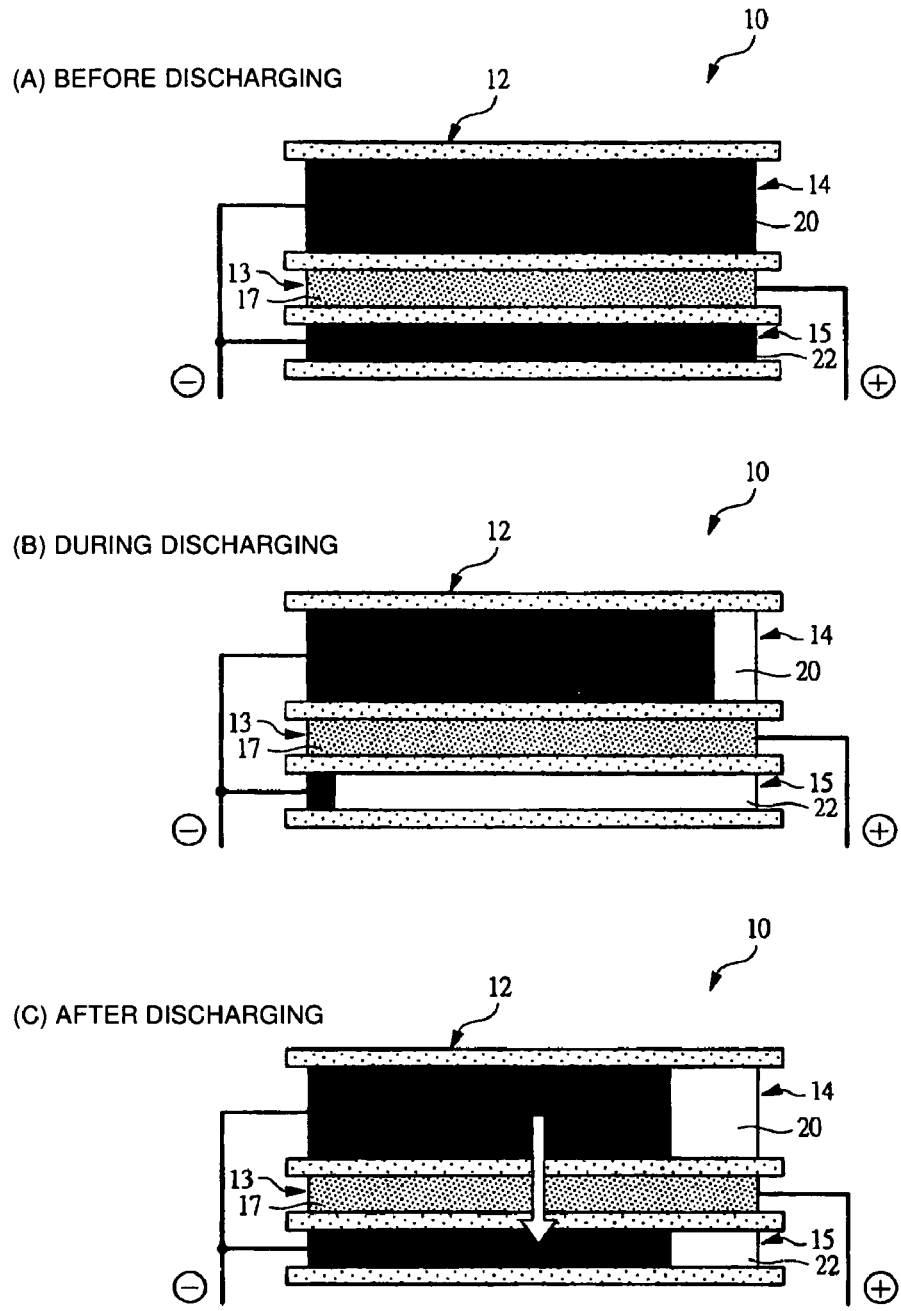
FIGS. 7A to 7C are imaginary views showing a transfer state of energy between the negative electrodes in the discharge operation.

FIGS. 6A to 6C are imaginary views showing the energy transfer condition between the negative electrodes during the charging, while FIGS. 7A to 7C are imaginary views showing the energy transfer condition between the negative electrodes during the discharging. In FIGS. 6A to 6C and 7A to 7C, the change in the potential is illustrated in the lateral direction, while the energy amount is illustrated with the colored area. Firstly, as shown in FIGS. 6A and 6B during the charging, energy is accumulated with high current into the negative-electrode mixture layer 22 containing a PAS, while energy is accumulated with low current into the negative-electrode mixture layer 20 containing a hard carbon. Then, as shown in FIG. 6C, after the charging, the energy in the negative-electrode mixture layer 22 is gradually transferred to the negative-electrode mixture layer 20 until the potentials of the negative-electrode mixture layer 20 and the negative-electrode mixture layer 22 reach an equilibrium potential. As described above, high-current charging can be performed by utilizing the high output characteristic of the negative-electrode mixture layer 22, and further, the energy in the negative-electrode mixture layer 22 can move to the negative-electrode mixture layer 20, with the result that the potential of the negative-electrode mixture layer 22, which is temporarily reduced, can be recovered. By virtue of this, large energy can temporarily be accumulated into the PAS that has a structure in which the metal lithium is difficult to be deposited, and then, the energy can gradually be transferred to the hard carbon. Accordingly, the metal lithium is prevented from being deposited on the hard carbon, on which the metal lithium is easy to be deposited, and the high output and high capacity of the electric storage device 10 can be achieved. Specifically, even if a high-current charging is performed, an excessive load is not applied on the negative-electrode mixture layer 20, and the deposition of the metal lithium can be prevented.

As shown in FIGS. 7A and 7B, in the discharging, energy is emitted from the negative-electrode mixture layer 22 containing a PAS with a high current, and energy is emitted from the negative-electrode mixture layer 20 containing a hard carbon with a low current. As shown in FIG. 7C, after the discharging, the energy of the negative-electrode mixture layer 20 is transferred to the negative-electrode mixture layer 22 until the potentials of the negative-electrode mixture layer 20 and the negative-electrode mixture layer 22 reach an equilibrium potential. As described above, the high-current discharging can be performed by utilizing the high output characteristic of the negative-electrode mixture layer 22, and the energy from the negative-electrode mixture layer 20 can be supplied to the negative-electrode mixture layer 22 so that the potential of the negative-electrode mixture layer 22, which temporarily rises, can be recovered. Accordingly, the high output and the high capacity of the electric storage device 10 can be achieved.

As explained above, the electric storage device 10 according to one embodiment of the present invention includes the negative-electrode mixture layer 20 and the negative-electrode mixture layer 22, each having a different charge/discharge characteristic, i.e., each being of different types, wherein the negative-electrode mixture layer 20 and the negative-electrode mixture layer 22 are connected to each other, and the through-holes 16a are formed on the positive-electrode current collector 16 arranged between the negative-electrode mixture layer 20 and the negative-electrode mixture layer 22. With this structure, even when the difference in potential is produced between the negative-electrode mixture layer 20 and the negative-electrode mixture layer 22 due to the difference in the charge/discharge characteristic, the lithium ions can move between the negative-electrode mixture layer 20 and the negative-electrode mixture layer 22, whereby the difference in the potential between the negative-electrode mixture layer 20 and the negative-electrode mixture layer 22 can be canceled. Accordingly, the charge/discharge characteristic of the negative-electrode mixture layer 20 and the charge/discharge characteristic of the negative-electrode mixture layer 22 can be combined to be utilized without applying a great load on the negative-electrode mixture layer 20 and the negative-electrode mixture layer 22. Consequently, the output density and the energy density of the electric storage device 10 can be enhanced, while ensuring the durability of the electric storage device 10. Further, the negative-electrode mixture layer 20 and the negative-electrode mixture layer 22 of different types are not in direct contact with each other. Therefore, even when one of the negative-electrode active materials is deteriorated, this deterioration does not affect the other negative-electrode active material, with the result that the durability of the electric storage device 10 can be enhanced.

Figure 8:
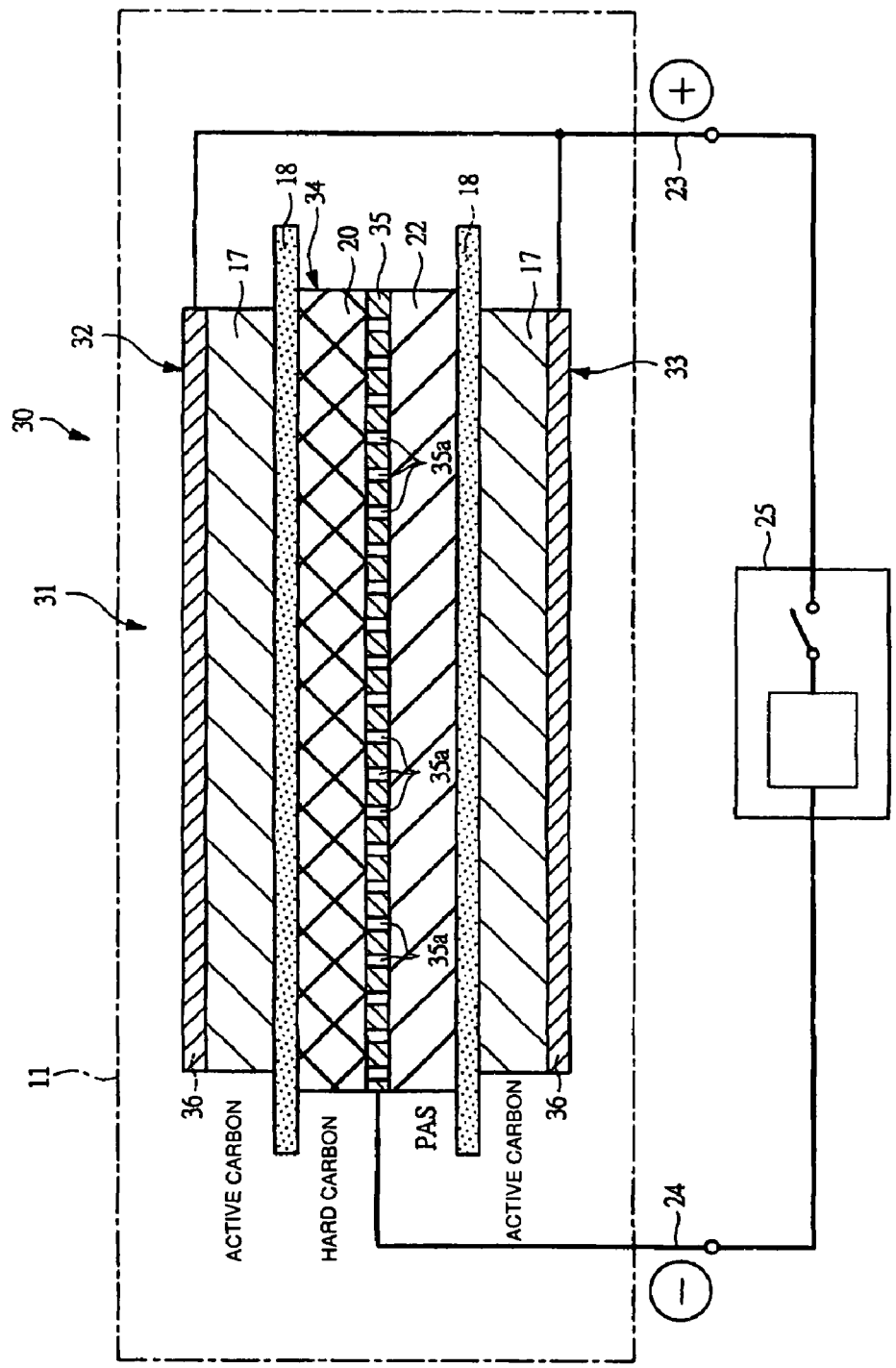
FIG. 8 is a sectional view schematically showing an internal structure of an electric storage device according to another embodiment of the present invention.

Next, another embodiment of the present invention will be explained. FIG. 8 is a sectional view schematically showing an internal structure of an electric storage device 30 according to another embodiment of the present invention. The components same as those shown in FIG. 1 are identified by the same numerals, and the explanation thereof is omitted. As shown in FIG. 8, an electrode laminate unit 31 is arranged at the inside of the laminate film 11 constituting an outer casing of the electric storage device 30. This electrode laminate unit 31 includes a positive electrode system having two positive electrodes 32 and 33 and a negative electrode system having a single negative electrode 34.

The negative electrode 34 arranged at the center of the electrode laminate unit 31 has a negative-electrode current collector (current collector) 35 provided with a large number of through-holes 35a, the first negative-electrode mixture layer 20 mounted on one surface of the negative-electrode current collector 35 and the second negative-electrode mixture layer 22 mounted on the other surface of the negative-electrode current collector 35. A first positive electrode 32 and a second positive electrode 33 are arranged with the separators 18 therebetween so as to sandwich the negative electrode 34. Each of the positive electrodes 32 and 33 includes a positive-electrode current collector (current collector) 36 and the positive-electrode mixture layer 17. Like the electric storage device 10 described above, the positive-electrode mixture layer 17 contains an active carbon as a positive-electrode active material, the negative-electrode mixture layer 20 contains a hard carbon as a negative-electrode active material, and the negative-electrode mixture layers 22 contain a PAS as a negative-electrode active material. The negative electrode terminal 24 is connected to the negative-electrode current collector 35 that connects the negative-electrode mixture layer 20 and the negative-electrode mixture layer 22, while the positive electrode terminal 23 is connected to the pair of the positive-electrode current collectors 36 that are connected to each other. Specifically, in the illustrated electric storage device 30, an electric storage component including the positive-electrode mixture layer 17 and the negative-electrode mixture layer 20 opposite to the positive-electrode mixture layer 17 and an electric storage component including the positive-electrode mixture layer 17 and the negative-electrode mixture layer 22 opposite to the positive-electrode mixture layer 17 are connected in parallel.

As described above, the negative-electrode mixture layer 20 and the negative-electrode mixture layer 22 of different types are electrically connected, and a great number of the through-holes 35a are formed on the negative-electrode current collector 35 arranged between the negative-electrode mixture layer 20 and the negative-electrode mixture layer 22, whereby the lithium ions can move between the negative-electrode mixture layer 20 and the negative-electrode mixture layer 22, like the electric storage device 10. Consequently, the output density and the energy density of the electric storage device 30 can be enhanced, while ensuring the durability of the electric storage device 30. Further, the negative-electrode mixture layer 20 and the negative-electrode mixture layer 22 are arranged to be adjacent to each other with the negative-electrode current collector 35 interposed therebetween. Therefore, the lithium ions can move quickly between the negative-electrode mixture layer 20 and the negative-electrode mixture layer 22.

Figure 9:
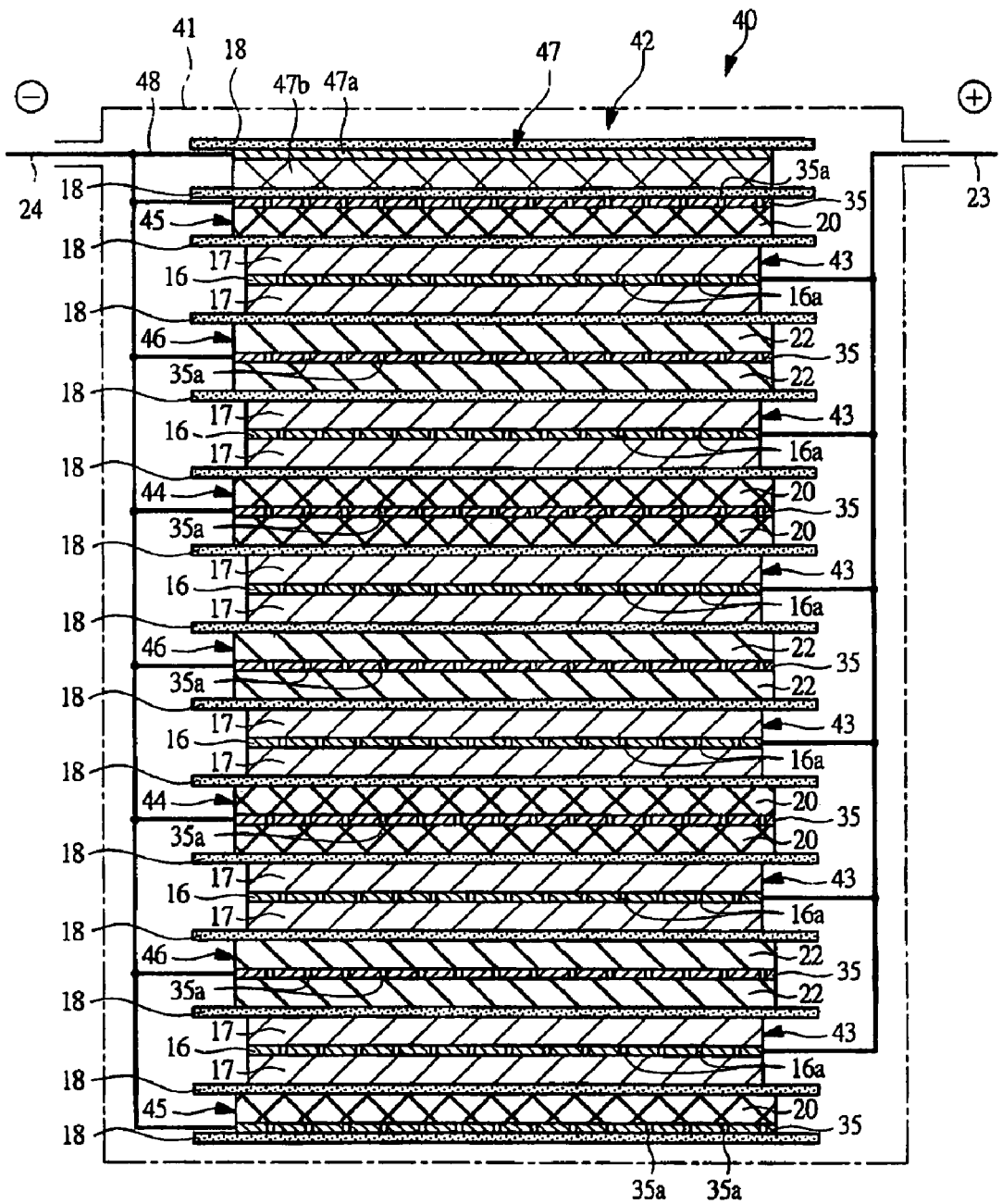
FIG. 9 is a sectional view schematically showing an internal structure of an electric storage device of a laminate type according to another embodiment of the present invention.

Next, another embodiment of the present invention will be explained. FIG. 9 is a sectional view schematically showing an internal structure of an electric storage device 40 of a laminate type according to another embodiment of the present invention. The components same as those shown in FIG. 1 and FIG. 8 are identified by the same numerals, and the explanation thereof is omitted.

As shown in FIG. 9, an electrode laminate unit 42 is arranged at the inside of a laminate film 41 constituting an outer casing of the electric storage device 40. This electrode laminate unit 42 includes a positive electrode system having six positive electrodes 43 and a negative electrode system having negative electrodes 44 to 46 the number of which is seven in total. The positive electrode system has positive electrodes 43 each including the positive-electrode current collector 16 provided with a large number of the through-holes 16a, and the positive-electrode mixture layers 17 mounted on both surfaces of the positive-electrode current collector 16. The negative electrode system has first negative electrodes 44 and 45 including the negative-electrode current collector 35 provided with a large number of the through-holes 35a, and the negative-electrode mixture layers 20 mounted on both surfaces or one surface of the negative-electrode current collector 35, and second negative electrodes 46 each including the negative-electrode current collector 35 provided with a large number of the through-holes 35a, and the negative-electrode mixture layers 22 mounted on both surfaces of the negative-electrode current collector 35. These positive electrodes 43 and the negative electrodes 44 to 46 are alternately laminated with the separators 18 arranged therebetween. Specifically, the electric storage device 40 has a device structure of a laminated type. Like the electric storage device 10 described above, the positive-electrode mixture layers 17 contain an active carbon as a positive-electrode active material, the negative-electrode mixture layers 20 contain a hard carbon as a negative-electrode active material, and the negative-electrode mixture layers 22 contain a PAS as a negative-electrode active material. The positive electrode terminal 23 is connected to the plural positive-electrode current collectors 16 that are connected to each other, while the negative electrode terminal 24 is connected to the plural negative-electrode current collectors 35 that are connected to each other.

A lithium ion source 47 is provided at the outermost part of the electrode laminate unit 42 so as to be opposite to the negative electrode 46. The lithium ion source 47 includes a lithium-electrode current collector 47a made of a conductive porous body such as a stainless mesh, and a metal lithium 47b adhered onto the lithium-electrode current collector 47a. The negative-electrode current collector 35 and the lithium-electrode current collector 47a are short-circuited via a lead wire 48, whereby lithium ions are eluted from the metal lithium 47b and can be doped into the negative-electrode mixture layers 20 and 22 by injecting an electrolyte into the laminate film 11. By doping the lithium ions into the negative-electrode mixture layers 20 and 22, the potential of the negative electrode can be reduced to thereby increase the capacity of the electric storage device 40.

A large number of the through-holes 16a and 35a are formed on the positive-electrode current collector 16 and the negative-electrode current collector 35. The lithium ions can freely move between the electrodes via the through-holes 16a and 35a, whereby the lithium ions can be doped all over the all the laminated negative-electrode mixture layers 20 and 22. Instead of the metal lithium 47b, an alloy that can supply lithium ions, such as a lithium—aluminum alloy, may be used. Further, the lithium ion source 47 and the positive electrodes 43 may be short-circuited so as to dope the lithium ions into the positive electrodes 43.

As described above, the negative-electrode mixture layer 20 and the negative-electrode mixture layer 22 of different types are electrically connected, and a great number of the through-holes 16a and 35a are formed on the positive-electrode current collector 16 and the negative-electrode current collector 35 arranged between the negative-electrode mixture layer 20 and the negative-electrode mixture layer 22, whereby the lithium ions can move between the negative-electrode mixture layer 20 and the negative-electrode mixture layer 22, like the electric storage device 10. Consequently, the output density and the energy density of the electric storage device 40 can be enhanced, while ensuring the durability of the electric storage device 40. Further, the device structure of the laminated type is employed, so that the electrodes of several types can easily be combined, which makes the structure of the electric storage device 40 simple. As described above, in the electric storage device 40 shown in FIG. 9, the negative electrode system is composed by alternately laminating the negative electrodes 44 and 45 containing the hard carbon and the negative electrodes 46 containing the PAS. However, the invention is not limited thereto. The negative electrode system may be composed of the laminates of the each negative electrodes 44 to 46.

Figure 10:
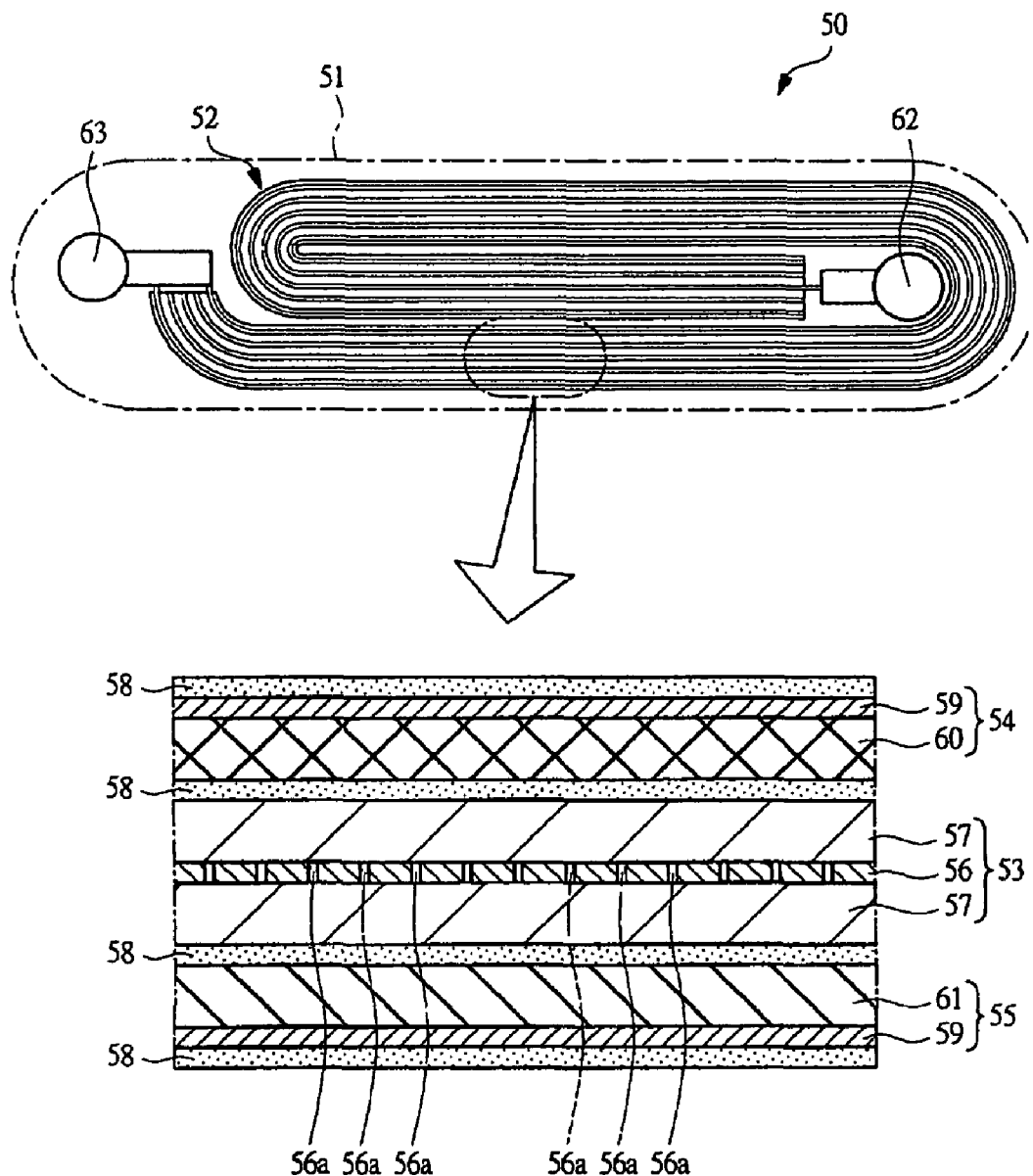
FIG. 10 is a sectional view schematically showing an internal structure of an electric storage device of a wound type according to another embodiment of the present invention.

Next, another embodiment of the present invention will be explained. FIG. 10 is a sectional view schematically showing an internal structure of an electric storage device 50 of a wound type according to another embodiment of the present invention. As shown in FIG. 10, an electrode wound unit 52 is arranged at the inside of a metal can 51 constituting an outer casing of the electric storage device 50. This electrode wound unit 52 includes a positive electrode system having one positive electrode 53 and a negative electrode system having two negative electrodes 54 and 55. The positive electrode 53 mounted at the center of the electrode wound unit 52 includes a positive-electrode current collector (current collector) 56 provided with a large number of through-holes 56a, and positive-electrode mixture layers 57 mounted on both surfaces of the positive-electrode current collector 56. The first negative electrode 54 and the second negative electrode 55 are arranged with a separator 58 interposed therebetween so as to sandwich the positive electrode 53. The first negative electrode 54 has a negative-electrode current collector (current collector) 59 and a first negative-electrode mixture layer 60 applied on the negative-electrode current collector 59, and the second negative electrode 55 has a negative-electrode current collector 59 and a second negative-electrode mixture layer 61 applied on the negative-electrode current collector 59. Like the electric storage device 10 described above, the positive-electrode mixture layer 57 contains an active carbon as a positive-electrode active material, the negative-electrode mixture layer 60 contains a hard carbon as a negative-electrode active material, and the negative-electrode mixture layer 61 contains a PAS as a negative-electrode active material. Further, a positive electrode terminal 62 is connected to the positive-electrode current collector 56, while a negative electrode terminal 63 is connected to the pair of the negative-electrode current collectors 59 that connects the negative-electrode mixture layers 60 and 61 to each other. The separator 58 adjacent to the negative-electrode current collector 59 may be omitted.

As described above, the negative-electrode mixture layer 60 and the negative-electrode mixture layer 61 of different types are electrically connected, and a great number of the through-holes 56a are formed on the positive-electrode current collector 56 arranged between the negative-electrode mixture layer 60 and the negative-electrode mixture layer 61, whereby the lithium ions can move between the negative-electrode mixture layer 60 and the negative-electrode mixture layer 61, like the electric storage device 10. Consequently, the output density and the energy density of the electric storage device 60 can be enhanced, while ensuring the durability of the electric storage device 60. Further, the device structure of the wound type is employed, with the result that the assembling process is simplified, so that the electric storage device 50 can be manufactured with low cost.

The components of each of the electric storage devices 10, 30, 40 and 50 will be explained in detail in the order described below: [A] negative electrode, [B] positive electrode, [C] negative-electrode current collector and positive-electrode current collector, [D] separator, [E] electrolyte, [F] outer casing.

[A] Negative Electrode

The negative electrode has the negative-electrode current collector and the negative-electrode mixture layer coated on the negative-electrode current collector, wherein the negative-electrode active material is contained in the negative-electrode mixture layer. The negative-electrode active material is not particularly limited, so long as it allows ions to be reversibly doped thereinto and de-doped therefrom. Examples of the negative-electrode active material include a graphite, various carbon materials, a polyacene-based material, a tin oxide, a silicon oxide. By appropriately selecting the negative-electrode active material that is included in the negative-electrode mixture layer from a graphite, various carbon materials, a polyacene-based material, a tin oxide, a silicon oxide, etc., the first negative-electrode mixture layer and the second negative-electrode mixture layer, each having different charge/discharge characteristic, can be formed.

A graphite and a hard carbon are preferable as the negative-electrode active material from the viewpoint of increasing the capacity of the electric storage device. Further, a polyacene-based organic semiconductor (PAS) that is a heat-treated material of an aromatic condensation polymer and has a polyacene skeletal structure, in which a ratio of a number of hydrogen atoms to a number of carbon atoms is 0.05 or more and 0.50 or less is preferable for the negative-electrode active material, since it can increase the capacity. It is preferable that the H/C of the PAS is within a range of not less than 0.05 and not more than 0.50. When the H/C of the PAS exceeds 0.50, the aromatic polycyclic structure is not sufficiently grown, so that the lithium ions cannot smoothly be doped or de-doped. Therefore, the charge/discharge efficiency of the electric storage device might be reduced. When the H/C of the PAS is less than 0.05, the capacity of the electric storage device can be decreased.

The negative-electrode active material such as a hard carbon and a PAS is formed into a powdery shape, a granular shape or a short fibrous shape. This negative-electrode active material is mixed with a binder to form a slurry. The slurry containing the negative-electrode active material is coated on the negative-electrode current collector and the resultant is dried, whereby the negative-electrode mixture layer is formed on the negative-electrode current collector. Usable binders mixed with the negative-electrode active material include a fluorine-containing resin such as polytetrafluoroethylene, polyvinylidene fluoride, etc., a thermoplastic resin such as polypropylene, polyethylene, polyacrylate, etc, or a rubber-based binder such as styrene butadiene rubber (SBR). The fluorine-based binder is preferably used. Examples of the fluorine-based binder include polyvinylidene fluoride, copolymer of vinylidene fluoride and trifluoroethylene, copolymer of ethylene and tetrafluoroethylene, copolymer of propylene and tetrafluoroethylene, etc. A conductive material such as an acetylene black, a graphite, a metal powder, etc. may appropriately be added to the negative-electrode mixture layer. A dispersant or a thickener may be added as needed, and for example, carboxymethyl cellulose may be added.

[B] Positive Electrode

The positive electrode has the positive-electrode current collector and the positive-electrode mixture layer coated on the positive-electrode current collector. The positive-electrode mixture layer contains the positive-electrode active material. The positive-electrode active material is not particularly limited, so long as it allows ions to be reversibly doped thereinto and de-doped therefrom. Examples of the positive-electrode active materials include an active carbon, a transition metal oxide, a conductive polymer, a polyacene-based material.

The active carbon contained in the positive-electrode mixture layer as the positive-electrode active material is made of an active carbon grain that is subject to an alkali activation treatment and has a specific surface area of not less than 600 $m^2/g$. A phenolic resin, a petroleum pitch, a petroleum coke, a coconut husk, a coal-derived coke, etc. are used as the material of the active carbon, wherein it is preferable to use a phenolic resin or coal-derived coke, since they can increase the specific surface area. Preferable alkali activators used for the alkali activation treatment of the active carbons include salts or hydroxides of a metal ion such as lithium, sodium, potassium, etc., wherein potassium hydroxide is more preferable. Examples of the methods of the alkali activation include the method in which a carbide and an activator are mixed, and then, the resultant is heated in an airflow of an inert gas, the method in which an activator is carried on a raw material of an active carbon beforehand, the resultant is heated, and then, a carbonizing process and activating process are performed, the method in which a carbide is activated with a gas activation by using, for example, water vapors, and then, the resultant is surface-treated with an alkali activator. The active carbon to which the alkali activation treatment is performed is pulverized by means of a known pulverizer such as a ball mill or the like. The grain size generally used within a wide range can be applied. For example, it is preferable that $D_{50}$ is 2 μm or more, more preferably 2 to 50 μm, and most preferably 2 to 20 μm. Further, the active carbon preferably having an average pore diameter of 10 nm or less and a specific surface area of 600 to 3000 $m^2/g$ is preferable. More preferably, an active carbon having a specific surface area of 800 $m^2/g$ or more, particularly 1300 to 2500 $m^2/g$ is preferable.

Lithium cobalt oxide ($LiCoO_2$) may be contained in the positive-electrode mixture layer as the positive-electrode active material. Examples of the other materials include a lithium-containing metal oxide represented by a chemical formula of $Li_xM_yO_z$ (x, y, z are positive numbers, M is a metal, or may be metals of two or more types) such as, $Li_xCoO_2$, $Li_xNiO_2$, $Li_xMnO_2$, $Li_xFeO_2$, a transition metal oxide such as a cobalt oxide, a manganese oxide, a vanadium oxide, a titanium oxide, or a nickel oxide, or a sulfide such as a cobalt sulfide, a manganese sulfide, a vanadium sulfide, a titanium sulfide, or a nickel sulfide. In a case of requiring a high voltage, a lithium-containing oxide having a potential of 4 V or more with respect to metal lithium is preferably used. More preferable lithium-containing oxides include a lithium-containing cobalt oxide, a lithium-containing nickel oxide, or a lithium-containing cobalt-nickel compound oxide.

The positive-electrode active material such as lithium cobalt oxide or the above described active carbon is formed into a powdery shape, a granular shape, a short fibrous shape, etc., and this positive-electrode active material is mixed with a binder to form a slurry. The slurry containing the positive-electrode active material is coated on the positive-electrode current collector and the resultant is dried, whereby the positive-electrode mixture layer is formed on the positive-electrode current collector. Usable binders mixed with the positive-electrode active material include a rubber binder such as SBR, a fluorine-containing resin such as polytetrafluoroethylene, polyvinylidene fluoride, a thermoplastic resin such as polypropylene, polyethylene, polyacrylate. A conductive material such as an acetylene black, a graphite, a metal powder, etc. may appropriately be added to the positive-electrode mixture layer. A dispersant or a thickener may be added as needed, and for example carboxymethyl cellulose may be added

[C] Negative-Electrode Current Collector and Positive-Electrode Current Collector The negative-electrode current collector and the positive-electrode current collector preferably have through holes penetrating therethrough. Examples thereof include an expanded metal, a punching metal, a net, an expanded member. The shape and number of the through hole are not particularly limited, and they are appropriately set so long as they do not hinder the movement of the anions and/or lithium ions. Various materials generally proposed for an organic electrolyte battery can be employed as the material of the negative-electrode current collector and the positive-electrode current collector. For example, stainless steel, copper, nickel, etc. can be used as the material of the negative-electrode current collector, and aluminum, stainless steel or the like can be used as the material of the positive-electrode current collector.

In the electric storage device 10 shown in FIG. 1, the negative-electrode current collectors 19 and 21 are not arranged between the negative-electrode mixture layer 20 and the negative-electrode mixture layer 22, so that the electric storage device 10 can be used without forming through-holes on the negative-electrode current collectors 19 and 21. In the electric storage device 30 shown in FIG. 7, the positive-electrode current collector 36 is not arranged between the negative-electrode mixture layer 20 and the negative-electrode mixture layer 22, so that the electric storage device 30 can be used without forming through-holes on the positive-electrode current collector 36.

[D] Separator

A porous member or the like having the durability with respect to the electrolyte, positive-electrode active material, negative-electrode active material, or the like, having an through hole and having no electron conductivity can be used for the separator. Generally, a cloth, a nonwoven fabric, or a porous body made of a paper (cellulose), a glass fiber, a polyethylene, a polypropylene, etc. is used. The thickness of the separator is preferably thin in order to reduce the internal resistance of the battery, but it may appropriately be set considering the holding amount of the electrolyte, strength of the separator, or the like.

[E] Electrolyte

It is preferable that an aprotic organic solvent containing a lithium salt is used for the electrolyte from the viewpoint that an electrolysis is not produced even by a high voltage and lithium ions can stably be present. Examples of the aprotic organic solvent include ethylene carbonate, propylene carbonate, dimethyl carbonate, diethyl carbonate, γ-butyloractone, acetonitrile, dimethoxyethane, tetrahydrofuran, dioxolane, methylene chloride, sulfolane, wherein these material are used singly or mixed with one another. Examples of the lithium salt include $LiClO_4$, $LiAsF_6$, $LiBF_4$, $LiPF_6$, $LIN(C_2F_5SO_2)_2$. Further, the concentration of the electrolyte in the electrolyte solution is preferably set to at least 0.1 mol/l or more, and more preferably set within a range of 0.5 to 1.5 mol/l, in order to reduce the internal resistance due to the electrolyte solution.

[F] Outer Casing

Various materials generally used for a battery can be used for the outer casing. A metal material such as iron or aluminum may be used, and a film material or the like may be used. The shape of the outer casing is not particularly limited. The outer casing may be formed into a shape appropriately selected according to the purpose, such as a cylindrical shape or a rectangular shape. From the viewpoint of the miniaturization or the reduction in weight of the electric storage device, it is preferable to use the film-type outer casing employing an aluminum laminate film. In general, a three-layered laminate film having a nylon film at the outer part, an aluminum foil at the middle part, and an adhesive layer such as a denatured polypropylene at the inner part is used.

The present invention will be explained in more detail with reference to Examples.

EXAMPLES

Example 1

Fabrication of Negative Electrode 1

A furfuryl alcohol, which was a raw material of a furan resin, was retained at 60° C. for 24 hours so as to cure the furfuryl alcohol, to thereby obtain a black resin. The obtained black resin was put into a stationary electric furnace, and heat-treated for 3 hours under a nitrogen atmosphere till the temperature reached 1200° C. The black resin was retained at 1200° C. for 2 hours. The sample taken out after the cooling was pulverized by means of a ball mill to obtain a hard carbon powder ($D_{50}$=5.0 μm, hydrogen atom/carbon atom=0.008) as a sample 1.

Then, 86 parts by weight of the sample 1, 6 parts by weight of acetylene black powder, 5 parts by weight of acrylic resin binder, 3 parts by weight of carboxylmethyl cellulose, and 200 parts by weight of water were fully mixed to obtain a slurry 1 for a negative electrode. The slurry 1 for a negative electrode was uniformly applied onto both surfaces of an expanded metal made of copper in a thickness of 32 μm (a porosity of 50%) by means of a die coater, and dried and pressed, whereby a negative electrode 1 with a thickness of 70 μm was produced.

[Fabrication of Negative Electrode 2]

A phenolic resin molding plate with a thickness of 0.5 mm was put into a Silicon it electric furnace and heat-treated under a nitrogen atmosphere at a rate of 50° C./hour till the temperature reached 500° C., and further heat-treated at the rate of 10° C./hour till the temperature reached 700° C., whereby a PAS plate was synthesized. The PAS plate thus obtained was pulverized with a disc mill to obtain PAS powders. The PAS powders had a H/C ratio of 0.17.

Then, 86 parts by weight of the above PAS powder, 6 parts by weight of acetylene black powder, 5 parts by weight of acrylic resin binder, 3 parts by weight of carboxylmethyl cellulose, and 200 parts by weight of water were fully mixed to obtain a slurry 2 for a negative electrode. The slurry 2 for a negative electrode was coated uniformly over both surfaces of a copper expanded metal having a thickness of 32 μm (a porosity of 50%) by a die coater, and dried and pressed, whereby a negative electrode 2 with a thickness of 86 μm was produced.

[Fabrication of Positive Electrode 1]

85 parts by weight of commercially available active carbon powder with a specific surface area of 2000 $m^2$/g, 5 parts by weight of acetylene black powder, 6 parts by weight of acrylic resin binder, 4 parts by weight of carboxylmethyl cellulose, and 200 parts by weight of water were fully mixed to obtain a slurry for a positive electrode.

Both surfaces of an aluminum expanded metal having a thickness of 35 μm (a porosity of 50%) was coated with a non-aqueous carbon conductive coating by a spraying method, and dried thereby to obtain a positive-electrode current collector having a conductive layer thereon. The total thickness (the sum of the current collector thickness and the conductive layer thickness) of the positive-electrode current collector was 52 μm, and most of the through-holes of the positive-electrode current collector were filled with the conductive coating. The slurry for the positive electrode was uniformly applied over both surfaces of the positive-electrode current collector by means of a roll coater, and dried and pressed to produce a positive electrode 1 having a thickness of 129 μm. The thickness of the positive-electrode mixture layer formed on the positive electrode 1 was 77 μm, and the area density of the positive-electrode active material was 3.5 mg/cm$^2$.

[Fabrication of Electrode Laminate Unit 1]

The negative electrode 1 was cut out into six pieces, each having an area of 6.0 cm×7.5 cm (excluding the terminal welding parts), the negative electrode 2 was cut out into six pieces, each having an area of 6.0 cm×7.5 cm (excluding the terminal welding parts), and the positive electrode 1 was cut out into eleven pieces, each having an area of 5.8 cm×7.3 cm (excluding the terminal welding parts). The negative electrodes 2 and the positive electrode 1 were alternately laminated through a separator of a nonwoven fabric made of cellulose/rayon with a thickness of 35 μm in a manner that the terminal welding parts of the positive-electrode current collectors and that of the negative-electrode current collectors were set in the opposite side. The negative electrodes were the outermost electrodes of the electrode laminate unit 1. Then, separators were arranged at the uppermost part and the lowermost part of the electrode laminate unit 1, and the four sides of the electrode laminate unit 1 were fastened with a tape. The terminal welding parts (eleven sheets) of the positive-electrode current collectors were ultrasonically welded to an aluminum positive electrode terminal (having a width of 50 mm, a length of 50 mm, a thickness of 0.2 mm), and the terminal welding parts (twelve sheets) of the negative-electrode current collectors were ultrasonically welded to a copper negative electrode terminal (having a width of 50 mm, a length of 50 mm, a thickness of 0.2 mm), thereby to obtain an electrode laminate unit 1.

[Fabrication of Cell 1]

A lithium electrode was formed by pressing a metal lithium foil onto a stainless steel mesh with a thickness of 80 μm. The lithium electrode was located on the upper part of the electrode laminate unit 1 such that it exactly faces the negative electrode at the outermost part. The terminal welding part of the lithium-electrode current collector was resistance-welded to the negative electrode terminal welding parts.

The three-electrode laminate unit was placed in a laminate film deep-drawn to 3.5 mm, and the opening portion was covered with other laminate film and three sides were heat-sealed. Then, the unit was vacuum-impregnated with an electrolyte solution (a solution formed by dissolving LiPF$_6$ at 1 mol/L into propylene carbonate). Then, the remaining one side of the unit was heat-sealed.

Accordingly, four cells 1 having the negative electrode 1 in which the negative-electrode mixture layer contained the hard carbon, and the negative electrode 2 in which the negative-electrode mixture layer contained the PAS were assembled, wherein the current collectors (expanded metal) provided with through-holes were arranged between the negative-electrode mixture layers of the negative electrode 1 and the negative electrode 2. The metal lithium located in each cell 1 was equivalent to 550 mAh/g per negative-electrode active material weight.

[Initial Evaluation of Cell 1]

The thus assembled cells 1 were left to stand for 20 days, and one cell of four cells was disassembled. It was confirmed that no metal lithium remained. From this fact, it was considered that the amount of lithium ion equivalent to 550 mAh/g per negative-electrode active material weight was pre-doped.

[Characteristic Evaluation of Cell 1]

The cell 1 was charged for thirty minutes by a constant current-constant voltage charging method in which the cell was charged at a constant current of 5000 mA till the cell voltage reached 3.8 V and then charged at a constant voltage of 3.8 V. Then, the cell was discharged at a constant current of 500 mA till the cell voltage reached 2.2 V. The cycle of the charging operation to 3.8 V and the discharging operation to 2.2 V was repeated, and when the cycle was repeated 10 times, the capacity and the energy density of the cell were evaluated. Subsequently, the cell was left for two hours in a thermostatic chamber at −20° C., and then, the cycle of the charging operation to 3.8 V and the discharging operation to 2.2 V was repeated, and when the cycle was repeated 1000 times, the capacity of the cell was evaluated after the cell was returned to a room temperature. The results of the evaluation are shown in Table 1 with the capacity retention ratio after 1000 cycles at −20° C. Numerical data in Table 1 are the average values of three cells.

TABLE 1

|  | Example 1 |
| --- | --- |
| Cell capacity (after 10 cycles at a room temperature) [mAh] | 97 |
| Energy density (Wh/l) | 13.9 |
| Cell capacity (after 1000 cycles at a low temperature) [mAh] | 92 |
| Capacity retention ratio (%) | 94.8 |

Comparative Example 1

Fabrication of Electrode Laminate Unit 2

The negative electrode 1 was cut out into twelve pieces, each having an area of 6.0 cm×7.5 cm (excluding the terminal welding parts), and the positive electrode 1 was cut out into eleven pieces, each having an area of 5.8 cm×7.3 cm (excluding the terminal welding parts). The electrode laminate unit 2 was fabricated in the same manner as in the Example 1, except that only the negative electrode 1 containing the hard carbon in the negative-electrode mixture layer was used as the negative electrode.

[Fabrication of Cell 2]

Four cells 2 were assembled in the same manner as in the Example 1 by using the electrode laminate unit 2. The metal lithium located in each cell 2 was equivalent to 500 mAh/g per negative-electrode active material weight.

[Initial Evaluation of Cell 2]

The thus assembled cells 2 were left to stand for 20 days, and one cell was disassembled. It was confirmed that no metal lithium remained. From this fact, it was considered that the amount of lithium ion equivalent to 500 mAh/g per negative-electrode active material weight was pre-doped.
[Characteristic Evaluation of Cell 2]

The cell 2 was charged for thirty minutes by a constant current-constant voltage charging method in which the cell was charged at a constant current of 5000 mA till the cell voltage reached 3.8 V and then charged at a constant voltage of 3.8 V. Then, the cell was discharged at a constant current of 500 mA till the cell voltage reached 2.2 V. The cycle of the charging operation to 3.8 V and the discharging operation to 2.2 V was repeated, and when the cycle was repeated 10 times, the capacity and the energy density of the cell were evaluated. Subsequently, the cell was left for two hours in a thermostatic chamber at −20° C., and then, the cycle of the charging operation to 3.8 V and the discharging operation to 2.2 V was repeated, and when the cycle was repeated 1000 times, the capacity of the cell was evaluated after the cell was returned to a room temperature. The results of the evaluation are shown in Table 2 with the capacity retention ratio after 1000 cycles at −20° C. Numerical data in Table 2 are the average values of three cells.

TABLE 2

|  | Comparative Example 1 |
|---|---|
| Cell capacity (after 10 cycles at a room temperature) [mAh] | 99 |
| Energy density (Wh/l) | 14.3 |
| Cell capacity (after 1000 cycles at a low temperature) [mAh] | 86 |
| Capacity retention ratio (%) | 86.9 |

Comparative Example 2

Fabrication of Electrode Laminate Unit 3

The negative electrode 2 was cut out into twelve pieces, each having an area of 6.0 cm×7.5 cm (excluding the terminal welding parts), and the positive electrode 1 was cut out into eleven pieces, each having an area of 5.8 cm×7.3 cm (excluding the terminal welding parts). The electrode laminate unit 3 was fabricated in the same manner as in the Example 1, except that only the negative electrode 2 containing the PAS in the negative-electrode mixture layer was used as the negative electrode.
[Fabrication of Cell 3]

Four cells 3 were assembled in the same manner as in the Example 1 by using the electrode laminate unit 3. The metal lithium located in each cell 3 was equivalent to 600 mAh/g per negative-electrode active material weight.
[Initial Evaluation of Cell 3]

The thus assembled cells 3 were left to stand for 20 days, and one of the cells 3 was disassembled. It was confirmed that no metal lithium remained. From this fact, it was considered that the amount of lithium ion equivalent to 600 mAh/g per negative-electrode active material weight was pre-doped.
[Characteristic Evaluation of Cell 3]

The cell 3 was charged for thirty minutes by a constant current-constant voltage charging method in which the cell was charged at a constant current of 5000 mA till the cell voltage reached 3.8 V and then charged at a constant voltage of 3.8 V. Then, the cell was discharged at a constant current of 500 mA till the cell voltage reached 2.2 V. The cycle of the charging operation to 3.8 V and the discharging operation to 2.2 V was repeated, and when the cycle was repeated 10 times, the capacity and the energy density of the cell were evaluated. Subsequently, the cell 3 was left for two hours in a thermostatic chamber at −20° C., and then, the cycle of the charging operation to 3.8 V and the discharging operation to 2.2 V was repeated, and when the cycle was repeated 1000 times, the capacity of the cell was evaluated after the cell was returned to a room temperature. The results of the evaluation are shown in Table 3 with the capacity retention ratio after 1000 cycles at −20° C. Numerical data in Table 3 are the average values of three cells.

TABLE 3

|  | Comparative Example 2 |
|---|---|
| Cell capacity (after 10 cycles at a room temperature) [mAh] | 93 |
| Energy density (Wh/l) | 12.8 |
| Cell capacity (after 1000 cycles at a low temperature) [mAh] | 91 |
| Capacity retention ratio (%) | 97.8 |

Comparison of Example 1, Comparative Example 1, and Comparative Example 2

The cell 1 according to the Example 1 includes the negative electrode 1 having the hard carbon, which has a great capacity, and the negative electrode 2 having the PAS, which has a low resistance. Therefore, it was confirmed from Table 1 that the cell 1 according to the Example 1 had a high energy density and a high capacity retention ratio. On the other hand, the cell 2 according to the Comparative Example 1 employs only the negative electrode 1 having the hard carbon, which has a great capacity, as a negative electrode. Therefore, it was confirmed from Table 2 that the cell 2 had a high energy density, but the capacity retention ratio was low due to the deposition of the metal lithium described below. The cell 3 according to the Comparative Example 2 employs only the negative electrode 2 having the PAS, which has a low resistance, as a negative electrode. Therefore, it was confirmed from Table 3 that the cell 3 had a high capacity retention ratio, but the energy density was low due to the capacity and the electrode density of the PAS that were lower than those of the hard carbon.

When the cells 1 to 3 that were subject to the charge/discharge test performed 1000 times under a low temperature of −20° C. were disassembled, the deposition of the metal lithium was not recognized on the negative electrode 1 containing the hard carbon and the negative electrode 2 containing the PAS of the cell 1 according to the Example 1, and the deposition of the metal lithium was not recognized on the negative electrode 2 containing the PAS of the cell 3 according to the Comparative Example 2. On the other hand, the deposition of the metal lithium was recognized on the negative electrode 1 containing the hard carbon of the cell 2 according to the Comparative Example 1. The deposition of the metal lithium is caused by the fact that the resistance of the hard carbon is higher than that of the PAS and the allowable storage quantity of the lithium ions of the hard carbon is lower than that of the PAS. When the cell 1 according to the Example 1 is charged, many lithium ions move to the negative electrode 2 containing the PAS having a low resistance, and then, these lithium ions slowly move from the negative electrode 2 to the negative electrode 1 through the through-holes of the current collector. Therefore, it is considered that the load on the negative electrode 1 containing the hard carbon is reduced, so that the metal lithium is not deposited.

Example 2

Fabrication of Positive Electrode 3

The slurry 1 for a negative electrode used in the Example 1 was applied over one surface of the negative-electrode current collector by means of a roll coater, dried, and pressed to produce a negative electrode with a thickness of 43 µm. Then, the slurry 2 for a negative electrode used in the Example 1 was applied over the other surface of the negative-electrode current collector by means of a roll coater, dried and pressed to produce a negative electrode 3 with a thickness of 78 µm. Specifically, the negative-electrode mixture layer containing the hard carbon was formed on one surface of the negative-electrode current collector, while the negative-electrode mixture layer containing the PAS was formed on the other surface of the negative-electrode current collector. The area density of the negative-electrode active material was 2.0 mg/cm$^2$ on both surfaces.

[Fabrication of Electrode Laminate Unit 4]

The negative electrode 3 was cut out into twelve pieces, each having an area of 6.0 cm×7.5 cm (excluding the terminal welding parts), and the positive electrode 1 was cut out into eleven pieces, each having an area of 5.8 cm×7.3 cm (excluding the terminal welding parts). The electrode laminate unit 4 was fabricated in the same manner as in the Example 1, except that only the negative electrode 3 having the negative-electrode mixture layer containing the hard carbon and the negative-electrode mixture layer containing the PAS was used as the negative electrode.

[Fabrication of Cell 4]

Four cells 4 were assembled in the same manner as in the Example 1 by using the electrode laminate unit 4. The metal lithium located in each cell 4 was equivalent to 550 mAh/g per negative-electrode active material weight.

[Initial Evaluation of Cell 4]

The thus assembled cells 4 were left to stand for 20 days, and one of the cells 4 was disassembled. It was confirmed that no metal lithium remained. From this fact, it was considered that the amount of lithium ion equivalent to 550 mAh/g per negative-electrode active material weight was pre-doped.

[Characteristic Evaluation of Cell 4]

The cell 4 was charged for thirty minutes by a constant current-constant voltage charging method in which the cell was charged at a constant current of 5000 mA till the cell voltage reached 3.8 V and then charged at a constant voltage of 3.8 V. Then, the cell was discharged at a constant current of 500 mA till the cell voltage reached 2.2 V. The cycle of the charging operation to 3.8 V and the discharging operation to 2.2 V was repeated, and when the cycle was repeated 10 times, the capacity and the energy density of the cell were evaluated. Subsequently, the cell 4 was left for two hours in a thermostatic chamber at −20° C., and then, the cycle of the charging operation to 3.8 V and the discharging operation to 2.2 V was repeated, and when the cycle was repeated 1000 times, the capacity of the cell was evaluated after the cell was returned to a room temperature. The results of the evaluation are shown in Table 4 with the capacity retention ratio after 1000 cycles at −20° C. Numerical data in Table 4 are the average values of three cells.

TABLE 4

|  | Example 2 |
| --- | --- |
| Cell capacity (after 10 cycles at a room temperature) [mAh] | 97 |
| Energy density (Wh/l) | 13.9 |
| Cell capacity (after 1000 cycles at a low temperature) [mAh] | 93 |
| Capacity retention ratio (%) | 95.9 |

Examination for Example 2

Like the cell 1 according to the Example 1, it was confirmed that the cell 4 according to the Example 2 had a high energy density and a high capacity retention ratio, since it had the negative electrode 3 including the negative-electrode mixture layer containing the hard carbon with a high capacity at one surface and the negative-electrode mixture layer containing the PAS with a low resistance on the other surface. When the cell 4 that was subject to the charge/discharge test performed 1000 times under a low temperature of −20° C. was disassembled, the deposition of the metal lithium was not recognized on the negative electrode 3 containing the hard carbon, which had a high resistance. Like the cell 1 according to the Example 1, when the cell 4 according to the Example 2 is charged, many lithium ions move to the negative-electrode mixture layer containing the PAS having a low resistance, and then, these lithium ions slowly move to the negative-electrode mixture layer containing the hard carbon through the through-holes of the current collector. Therefore, it is considered that the load on the negative-electrode mixture layer containing the hard carbon is reduced, so that the metal lithium is not deposited. The capacity retention ratio becomes higher than that in the Example 1. It is estimated that it is because the moving speed of the lithium ions is faster than that in the Example 1, since the negative-electrode mixture layer of two different types are applied on both surfaces of the current collector.

Example 3

Fabrication of Positive Electrode 2

92 parts by weight of commercially available LiCoO$_2$ powder, 4.5 parts by weight of graphite powder, and 3.5 parts by weight of polyvinylidene fluoride (PVdF) powder were mixed, and then, N-methyl pyrrolidone was added thereto. The resultant was thoroughly stirred and defoamed, where by a slurry 2 for a positive electrode was obtained. The slurry 2 for a positive electrode was uniformly applied over both surfaces of the positive-electrode current collector by means of a roll coater, and dried and pressed to produce a positive electrode 2 having a thickness of 169 µm.

[Fabrication of Electrode Laminate Unit 5]

The negative electrode 1 was cut out into six pieces, each having an area of 6.0 cm×7.5 cm (excluding the terminal welding parts), the negative electrode 2 was cut out into six pieces, each having an area of 6.0 cm×7.5 cm (excluding the terminal welding parts), and the positive electrode 2 was cut out into eleven pieces, each having an area of 5.8 cm×7.3 cm (excluding the terminal welding parts). The negative electrodes 2, and the positive electrode 2 were alternately laminated through a separator of a nonwoven fabric made of cellulose/rayon with a thickness of 35 μm in a manner that the terminal welding parts of the positive-electrode current collectors and the negative-electrode current collectors were set in the opposite side. The negative electrodes were the outermost electrodes of the electrode laminate unit 5. Then, separators were arranged at the uppermost part and the lowermost part, and the four sides of the structure were fastened with a tape. The terminal welding parts (eleven sheets) of the positive-electrode current collectors were ultrasonically welded to an aluminum positive electrode terminal (having a width of 50 mm, a length of 50 mm, a thickness of 0.2 mm), and the terminal welding parts (twelve sheets) of the negative-electrode current collectors were ultrasonically welded to a copper negative electrode terminal (having a width of 50 mm, a length of 50 mm, a thickness of 0.2 mm), thereby to obtain an electrode laminate unit 5.

[Fabrication of Cell 5]

Four cells 5 were assembled in the same manner as in the Example 1 by using the electrode laminate unit 5 except that the lithium electrode was not provided.

[Characteristic Evaluation of Cell 5]

The cell 5 was charged for twelve hours by a constant current-constant voltage charging method in which the cell was charged at a constant current of 500 mA till the cell voltage reached 4.2 V and then charged at a constant voltage of 4.2 V. Then, the cell was discharged at a constant current of 50 mA till the cell voltage reached 3.0 V. The cycle of the charging operation to 4.2 V and the discharging operation to 3.0 V was repeated, and when the cycle was repeated 10 times, the capacity and the energy density of the cell were evaluated. Subsequently, the cell 5 was left for two hours in a thermostatic chamber at −20° C., and then, the cycle of the charging operation to 4.2 V and the discharging operation to 3.0 V was repeated, and when the cycle was repeated 50 times, the capacity of the cell was evaluated after the cell was returned to a room temperature. The results of the evaluation are shown in Table 5 with the capacity retention ratio after 50 cycles at −20° C. Numerical data in Table 5 are the average values of three cells.

TABLE 5

|  | Example 3 |
|---|---|
| Cell capacity (after 10 cycles at a room temperature) [mAh] | 717 |
| Energy density (Wh/l) | 128 |
| Cell capacity (after 50 cycles at a low temperature) [mAh] | 624 |
| Capacity retention ratio (%) | 87.0 |

Comparative Example 3

Fabrication of Cell 6

Four cells 6 were assembled in the same manner as in the Example 3 except that an aluminum foil having no through-holes was used for the positive-electrode current collector and a copper foil having no through-holes was used for the negative-electrode current collector.

[Characteristic Evaluation of Cell 6]

The cell 6 was charged for twelve hours by a constant current-constant voltage charging method in which the cell was charged at a constant current of 500 mA till the cell voltage reached 4.2 V and then charged at a constant voltage of 4.2 V. Then, the cell was discharged at a constant current of 50 mA till the cell voltage reached 3.0 V. The cycle of the charging operation to 4.2 V and the discharging operation to 3.0 V was repeated, and when the cycle was repeated 10 times, the capacity and the energy density of the cell were evaluated. Subsequently, the cell 6 was left for two hours in a thermostatic chamber at −20° C., and then, the cycle of the charging operation to 4.2 V and the discharging operation to 3.0 V was repeated, and when the cycle was repeated 50 times, the capacity of the cell was evaluated after the cell was returned to a room temperature. The results of the evaluation are shown in Table 6 with the capacity retention ratio after 50 cycles at −20° C. Numerical data in Table 6 are the average values of three cells.

TABLE 6

|  | Comparative Example 3 |
|---|---|
| Cell capacity (after 10 cycles at a room temperature) [mAh] | 697 |
| Energy density (Wh/l) | 124 |
| Cell capacity (after 50 cycles at a low temperature) [mAh] | 532 |
| Capacity retention ratio (%) | 76.3 |

Comparison of Example 3 and Comparative Example 3

Even if the positive-electrode active material is changed from the active carbon to the $LiCoO_2$ having a great capacity, the cell 5 according to the Example 3 includes the negative electrode 1 having the hard carbon, which has a great capacity, and the negative electrode 2 having the PAS, which has a low resistance. Therefore, it was confirmed from Table 5 that the cell 5 according to the Example 3 had a high energy density and a high capacity retention ratio. On the other hand, the cell 6 according to the Comparative Example 3 employs only the negative electrode 1 having the hard carbon, which has a great capacity, as a negative electrode. Therefore, it was confirmed from Table 6 that the cell 6 had a high energy density, but the capacity retention ratio was low due to the deposition of the metal lithium described below.

When the cells 5 and 6 that were subject to the charge/discharge test performed 50 times under a low temperature of −20° C. were disassembled, the deposition of the metal lithium was not recognized on the negative electrode 1 containing the hard carbon and the negative electrode 2 containing the PAS of the cell 5 according to the Example 3. On the other hand, the deposition of the metal lithium was recognized on the negative electrode 1 containing the hard carbon of the cell 6 according to the Comparative Example 3. The deposition of the metal lithium is caused by the fact that the resistance of the hard carbon is higher than that of the PAS and the allowable storage quantity of the lithium ions of the hard carbon is lower than that of the PAS. When the cell 5 according to the Example 3 is charged, many lithium ions move to the negative electrode 2 containing the PAS having low resistance, and then, these lithium ions slowly move from the negative electrode 2 to the negative electrode 1 through the through-holes of the current collector. Therefore, it is considered that the load on the negative electrode 1 containing the hard carbon is reduced, so that the metal lithium is not deposited. On the other hand, it is considered that, since the current collector in the Comparative Example 3 is made of the aluminum foil and the copper foil having no through-holes, the lithium ions from the positive electrode, which is opposite to the hard carbon having a small allowable storage quantity of lithium ions, cannot be temporarily stored to the PAS through the through-holes, whereby the metal lithium is deposited.

The present invention is not limited to the above embodiments, and various modifications are possible without departing from the scope of the present invention. For example, in the illustrated electric storage devices 10, 30, 40, and 50, two negative-electrode mixture layers of different types (characteristics) 20 and 22, 60 and 61 are connected to each other, and the through-holes 16a, 35a, and 56a are formed on the positive-electrode current collectors 16 and 56 or the negative-electrode current collector 35 arranged between the negative-electrode mixture layers 20 and 22, 60 and 61. However, the invention is not limited thereto. Three or more negative-electrode mixture layers of different types can be connected to one another, and the through-holes may be formed on the negative-electrode current collector and the positive-electrode current collector arranged between these negative-electrode mixture layers.

The positive-electrode active material and the negative-electrode active material are not limited to the active materials of the above embodiments. Various active materials used for a conventional battery or a capacitor is applicable. Further, various electrolytes and separators used for a conventional battery or a capacitor can also be used for the electrolyte and the separator 18.

The electric storage device according to the present invention is greatly effective as a driving storage power source or an auxiliary storage power source for an electric vehicle, a hybrid vehicle, or the like. Further, the electric storage device according to the present invention is well adaptable to a driving storage power source for an electric bicycle, a motorized wheelchair, or the like, a storage power source used in a photovoltaic power generating device or a wind power generating device, or a storage power source used in a portable device or an electric appliance.

What is claimed is:

1. An electric storage device comprising:
   a positive electrode system including a positive electrode having a current collector and a positive-electrode mixture layer; and
   a negative electrode system including a negative electrode having a current collector and a negative-electrode mixture layer, wherein
   the negative electrode system includes a first negative-electrode mixture layer and a second negative-electrode mixture layer, which are connected to each other and which include at least one different material or have different material composition ratios,
   the first negative-electrode mixture layer and the second negative-electrode mixture layer have different charge/discharge characteristics, and
   a through-hole is formed in the current collector arranged between the first negative-electrode mixture layer and the second negative-electrode mixture layer.

2. The electric storage device according to claim 1, wherein the first negative-electrode mixture layer and the second negative-electrode mixture layer are electrically connected to each other for moving ions between the first negative-electrode mixture layer and the second negative-electrode mixture layer via the through-hole.

3. The electric storage device according to claim 1, wherein each the first negative-electrode mixture layer and the second negative-electrode mixture layer includes an active material differ from each other.

4. The electric storage device according to claim 1, wherein the first negative-electrode mixture layer contains one selected from the group consisting a polyacene-based organic semiconductor which is a heat-treated material of an aromatic condensation polymer and has a polyacene skeletal structure in which a ratio of a number of hydrogen atoms to a number of carbon atoms is 0.05 or more and 0.50 or less, a graphite, and a hard carbon, as a negative-electrode active material, and
the second negative-mixture layer contains one selected from the group consisting of two of the above three active materials other than the negative-electrode active material contained in the first negative-electrode mixture layer, as a negative-electrode active material.

5. The electric storage device according to claim 1, wherein the negative electrode system includes a first negative electrode and a second negative electrode that sandwich the positive electrode, wherein the through-hole is formed in the current collector of the positive electrode arranged between the first negative-electrode mixture layer of the first negative electrode and the second negative-electrode mixture layer of the second negative electrode.

6. The electric storage device according to claim 1, wherein the positive electrode system includes a first positive electrode and a second positive electrode that sandwich the negative electrode, wherein the though-hole is formed in the current collector of the negative electrode having the first negative-electrode mixture layer on its one surface and the second negative-electrode mixture layer on its other surface.

7. The electric storage device according to claim 1, further comprising:
   a lithium ion source that is short-circuited to at least either one of the negative electrode and the positive electrode, wherein
   lithium ions are doped from the lithium ion source into at least either one of the negative electrode and the positive electrode.

8. The electric storage device according to claim 1, wherein the device structure is a laminate type in which the positive electrode and the negative electrode are alternately laminated, or a wound type in which the positive electrode and the negative electrode are laminated and wound.

9. The electric storage device according to claim 1, wherein the positive-electrode mixture layer contains an active carbon.

* * * * *